United States Patent [19]

Yokota et al.

[11] Patent Number: 5,253,991
[45] Date of Patent: Oct. 19, 1993

[54] APPARATUS FOR PRODUCING SPHEROIDAL INORGANIC PARTICULATE MATERIAL

[75] Inventors: Norio Yokota, Narashino; Takahiko Yoshimura, Warabi; Shusuke Harada, Narashino; Masatoshi Onodera, Narashino; Akihiko Miyauchi, Narashino, all of Japan

[73] Assignee: Sumitomo Cement Co., Ltd., Tokyo, Japan

[21] Appl. No.: 754,733

[22] Filed: Sep. 4, 1991

Related U.S. Application Data

[62] Division of Ser. No. 662,562, Feb. 28, 1991, abandoned, which is a division of Ser. No. 615,432, Nov. 16, 1990, abandoned.

[30] Foreign Application Priority Data

| Nov. 20, 1989 | [JP] | Japan | 1-301462 |
| Dec. 28, 1989 | [JP] | Japan | 1-340516 |
| Dec. 28, 1989 | [JP] | Japan | 1-340517 |
| Dec. 28, 1989 | [JP] | Japan | 1-340518 |
| Mar. 26, 1990 | [JP] | Japan | 2-75950 |
| Mar. 26, 1990 | [JP] | Japan | 2-75951 |
| Mar. 26, 1990 | [JP] | Japan | 2-75952 |
| Apr. 13, 1990 | [JP] | Japan | 2-98661 |
| Jun. 7, 1990 | [JP] | Japan | 2-149187 |
| Jun. 8, 1990 | [JP] | Japan | 2-150306 |
| Jun. 8, 1990 | [JP] | Japan | 2-150307 |

[51] Int. Cl.$^5$ ............ B28B 1/54; B29B 9/16
[52] U.S. Cl. .................. 425/6; 264/8; 264/15
[58] Field of Search ........ 65/18.2, 21.3, 120, 65/142; 264/5, 8, 15; 425/6

[56] References Cited

U.S. PATENT DOCUMENTS

| 2,676,892 | 4/1954 | McLaughlin | 65/142 |
| 2,794,301 | 6/1957 | Law et al. | 65/21.3 |
| 3,404,199 | 10/1968 | Hoffmann | 65/18.2 |
| 3,510,289 | 5/1970 | Boivent | 65/142 |
| 3,560,074 | 2/1971 | Searight et al. | 65/142 |
| 4,201,560 | 5/1980 | Dewitte et al. | 65/21.3 |
| 4,238,430 | 12/1980 | Phillips | 264/15 |
| 4,385,917 | 5/1983 | Aston et al. | 65/21.3 |
| 4,530,651 | 7/1985 | Bucchi | 425/6 |

FOREIGN PATENT DOCUMENTS

| 62-241541 | 10/1987 | Japan | 425/6 |
| 62-241542 | 10/1987 | Japan | 425/6 |
| 62-241543 | 10/1987 | Japan | 425/6 |

Primary Examiner—Scott Bushey
Attorney, Agent, or Firm—Kane, Dalsimer, Sullivan, Kurucz, Levy, Eisele & Richard

[57] ABSTRACT

The present invention is directed to a spheroidal particulate inorganic material of an inorganic particulate material such as spheroidal cement or slag whose respective particles are of a substantially spheroidal shape and have smooth surfaces having improved flowability and filling properties. The spheroidal particulate material is produced by subjecting the respective particles of the particulate inorganic material to a high temperature flame treatment and rapid cooling in air, or by dispersing fine particles of the inorganic material and an organic or inorganic binder in a non-aqueous solvent to form a slurry and granulating the slurry. Compositions containing the spheroidal particulate inorganic material are used in civil engineering works and construction. To improve energetic efficiency in the production of the spheroidal particulate inorganic material, particularly spheroidal cement or slag, an apparatus is used which is a retention furnace for retaining a molten liquid inorganic material, a nozzle assembly communicated to the retention furnace and capable of scattering therethrough the molten liquid inorganic material, a jet gas for entraining the molten inorganic material introduced in the nozzle assembly and scattering the molten inorganic material to cool it, and gas spray means for spraying the jet gas.

10 Claims, 5 Drawing Sheets

APPARATUS FOR PRODUCING SPHEROIDAL INORGANIC PARTICULATE MATERIAL

This is a divisional of co-pending application Ser. No. 07/662,562 filed on Feb. 28, 1991 now abandoned, which is a divisional of application Ser. No. 615,432 filed on Nov. 16, 1990, abandoned.

BACKGROUND OF THE INVENTION

1. Field of the Invention

The present invention relates to inorganic materials such as cement and slag as well as construction compositions containing cement or slag which are used mainly in constructions or buildings and civil engineering works and to methods for the production of such inorganic materials. The present invention also relates to apparatuses for the production of spheroidal inorganic materials.

2. Description of Related Arts

In forming various constructions or building or civil engineering works, a large amount of inorganic construction materials such as cement, slag or the like have been used. Also, various inorganic compositions for use in civil engineering works or construction, such as those for ground stabilization treatment, for example, ground improvers and solidifiers, and compositions for use as concrete or mortar work materials, for example, admixtures or adjuvants, grout materials, plastering materials and the like have been used.

In order to improve the flowability or filling properties thereof, it has been a common practice to add fly ash, an organic adjuvant or the like upon use. Fly ash, which is obtained mainly as a by-product of steam power stations in the form of fine powder of coal ash or cinders, is somewhat limited not only in amount but also in application because it contains carbon to be burned and has a blackish gray color. Organic adjuvant is expensive and the use thereof increases costs. Furthermore, the organic adjuvant changes only the surface activity of the particles concerned, failing to completely solve the question of improving the flowability and filling properties of the material.

In the case where cement such as Portland cement is to be produced, it has heretofore been the practice that raw materials are pulverized and the resulting suspension is preheated in a suspension preheater, calcined in a rotary kiln and the resulting cement clinker is then cooled rapidly in a cooler with air. The cooled cement clinker is then admixed with gypsum powder and the mixture is pulverized using a tube mill, for example, to obtain cement having a desired particle size. Thus, in the production of cement, the cement clinker is brought into contact with air to rapidly cool it. The clinker obtained as by means of an air quenching cooler includes masses having an average particle diameter of from several cm to several tens of cm, and in order to adjust the particle size of the clinker to a predetermined value, usually a mass having a particle size no smaller than a predetermined value (e.g., several cm or less) must be roughly ground to have a value no larger than a predetermined value. The rough grinding of the cement clinker prior to charging into a tube mill or the like makes the production procedure complicated and makes continuous production difficult. In order to overcome this disadvantage, it has already been proposed that the inside of the tube mill be divided into two rooms, i.e., an anterior room and a posterior room and that rough grinding be conducted in the anterior room and pulverization in the exterior room. While this proposal has solved the problem of continuous production, the procedure is still complicated, and furthermore, the particles obtained are angular or have sharp edges, thus increasing the frictional resistance between the particles, resulting in a situation such that when cement and water are kneaded the cement composition or slurry has somewhat poor flowability and filling properties.

On the other hand, slag is an artificial mixture formed purposely when metals are molten in a furnace, such as smelting by the addition of a flux. Slag is composed mainly of silica ($SiO_2$) and is utilized for the production of Portland blast furnace cement, bricks, ballast, or gravel and the like. Usually, the particle size of the slag is adjusted to a predetermined value before the slag is used by grinding bulky or sandy slag just after it is discharged from the furnace, using a tube mill or a vertical mill, with a following admixture of gypsum, if desired, and pulverization. Conventional slag has also a problem in that it is in the form of particles which have sharp edges or which are angular and cause frictional resistance between the particles, thus decreasing, more or less, the flowability and filling properties of the slag particles themselves and of compositions to which the slag particles are added.

Furthermore, in the case of quick-hardening cement which includes cement clinker powder containing a quick-hardening component ($11CaO \cdot 7Al_2O_3 \cdot CaF_2$) in an amount of from 1 to 30% by weight based on the total weight of the composition and anhydrous or semi-anhydrous cement as disclosed in Japanese Patent Publications Nos. 39924/1972 and 36491/1978, it is difficult to control the hardening time of the quick-hardening cement. In order to solve this problem, it has hitherto been proposed to add a retarder. However, the addition of a retarder in the quick-hardening cement composition with a view to controlling its hardening time results in a considerable decrease of the final strength of the cement composition. Attempts to control the hardening time by admixing a quick-hardening cement with an ordinary cement (non-quick-hardening cement) in various proportions have led to another problem in that a decrease in strength occurs due to the anhydrous gypsum contained in the ordinary cement. In addition, the ordinary cement has low flowability as described above.

Furthermore, an improvement in the energetic efficiency of the process for the production of such particulate inorganic material has also been desired.

SUMMARY OF THE INVENTION

Therefore, it is an object of the present invention to provide an inorganic particulate material which can be used in civil engineering works or construction and which has a low interparticle resistance and thus has high flowability and high filling properties.

Another object of the present invention is to provide an inorganic composition which can be used in civil engineering works or construction and has high flowability and high filling properties.

Still another object of the present invention is to provide a method for producing an inorganic particulate material which can be used in civil engineering works or construction and has low interparticle resistance and thus has high flowability and high filling properties.

Yet another object of the present invention is to provide an apparatus for producing an inorganic particulate material which can be used in civil engineering works or construction and has low interparticle resistance and thus has high flowability and high filling properties.

As a result of extensive investigations, it has now been found that the above-described objects of the present invention can be achieved by rendering the particles of the inorganic material spheroidal, for example, by passing them through a high temperature flame to change them to a molten or semi-molten state and rapidly cooling them in air.

Therefore, the present invention provides a spheroidal particulate inorganic material which comprises particles of an inorganic material, wherein the respective particles are of a substantially spheroidal shape and have smooth surfaces.

Also, the present invention provides an inorganic composition for use in civil engineering works or construction, which comprises as a main component or an additive a spheroidal particulate inorganic material, wherein respective particles of the inorganic material are of a substantially spherical shape and have smooth surfaces.

Further, the present invention provides a method for producing a spheroidal particulate inorganic material which can be used in civil engineering works or construction and has a low interparticle resistance and thus has high flowability and high filling properties, which method comprises providing particles of an inorganic material, passing the particles through a high temperature flame from a burner to convert the particles to a molten or semi-molten state, and rapidly cooling the particles, so that the particles after the cooling are of a substantially spherical shape as a result of their surface tension.

Still further, the present invention provides a method for producing a spheroidal particulate inorganic material which can be used in civil engineering works or construction and has a low interparticle resistance and thus has high flowability and high filling properties, which method comprises providing fine particles of an inorganic material, dispersing the fine particles of the inorganic material and an organic or inorganic binder in a non-aqueous solvent to form a slurry, granulating the slurry, and optionally adding an additive powder.

Also, the present invention provides an apparatus for producing a spheroidal particulate inorganic material composed of particles of an inorganic material such as cement or slag, comprising a retention furnace for retaining a molten liquid inorganic material, a nozzle or nozzles communicated to the retention furnace and capable of scattering therethrough the Molten liquid inorganic material, a jet gas for entraining the molten inorganic material introduced in the nozzle or nozzles and scattering the molten inorganic material to cool it, and gas spray means for spraying the jet gas.

In addition, the present invention provides an apparatus for producing a spheroidal particulate inorganic material composed of particles of an inorganic material such as cement or slag, comprising a rotary kiln.

Furthermore, the present invention provides an apparatus for producing a spheroidal particulate inorganic material composed of spheroidal particles of an inorganic material, having a suspension preheater for preheating a suspension of a raw inorganic material, a rotary kiln connected to said suspension preheater, to which a powder of said raw inorganic material is supplied, a cooler connected to said rotary kiln, to which said raw inorganic material is supplied, wherein said apparatus comprises a burner which is connected to said rotary kiln and generates a high temperature flame through which said powder of said raw inorganic material is passed to be melted or semi-melted, an introductory portion which is communicated both to said cooler and to said burner and introduces a first exhaust gas discharged from said cooler into said burner, and a feed portion which is communicated both to said burner and to said preheater or to said rotary kiln and feeds a second exhaust gas discharged from said rotary kiln into said preheater or to said rotary kiln.

The spheroidal particulate inorganic material, particularly the spheroidal cement or spheroidal slag, of the present invention includes particles of a substantially spherical shape, thus having low interparticulate frictional resistance, and has a higher flow value than conventional non-spheroidal particulate inorganic material. In the case of spheroidal cement, it has a higher flow value as compared with a conventional non-spheroidal cement at the same water/cement ratio, which improves its flowability and filling properties, resulting in that a hardened mass of the spheroidal cement is dense and has a higher strength than a hardened mass of the conventional non-spheroidal cement. The inorganic composition of the present invention also has an improved flow value and thus increased flowability and filling properties.

The above and other objects, effects, features and advantages of the present invention will become more apparent from the following description of the embodiments thereof taken in conjunction with the accompanying drawings.

BRIEF DESCRIPTION OF THE ACCOMPANIED DRAWINGS

DETAILED DESCRIPTION OF THE INVENTION

Figure 1:
FIG. 1 is an electron micrograph of a spheroidized cement clinker according to the present invention.

The spheroidal particulate inorganic material of the present invention includes as typical examples spheroidal cement, spheroidal slag cement, and spheroidal quick-hardening Portland cement. The inorganic material contains spheroidal particles which have a substantially spherical shape as shown in FIG. 1. The inorganic composition of the present invention contains the spheroidal particulate inorganic material.

I. Preparation of Spheroidal Cement

The spheroidal particulate inorganic material of the present invention includes typically a spherodial cement, spheroidal slag or the like which can be used as a material for use in construction or civil engineering works or as a composition in admixture with one or more other materials such as those for ground stabilization treatment, for example, a ground improver and a solidifier, or concrete or mortar work materials, for example, an admixture or adjuvant, a grout material, a plastering material and the like.

The spheroidal particulate inorganic material of the present invention has an average particle diameter of about 40 $\mu$m or less. If the average particle diameter of the spheroidal particulate inorganic material of the present invention is more than about 40 $\mu$m, no substantial improvement can be obtained in the flowability and filling properties thereof or that of the various compositions containing it.

The spheroidal particulate inorganic material of the present invention can be prepared by a thermal spheroidizing treatment or a granulating treatment. It can also be prepared by the collision of the particles themselves while entrained in a rapid stream of gas.

(a) Thermal Spheroidizing Treatment

Preparation of the spheroidal particulate inorganic material of the present invention will first be explained taking a spheroidal cement as an example.

The spheroidal cement of the present invention can be prepared by providing particles of Portland cement clinker and particles of gypsum which may be a spheroidal gypsum, passing the particles of the cement clinker and optionally the particles of the gypsum through a high temperature flame to convert the particles of the cement clinker and optionally the particles of the gypsum, if present, to a molten or semi-molten state, rapidly cooling the molten or semi-molten particles to solidify them, and optionally adding the particles of the gypsum to the solidified particles, provided that the particles of the cement clinker alone are passed through the flame so that the particles after the cooling are of a substantially spherical shape having a predetermined average particle diameter due to their surface tension.

For example, raw materials for preparing Portland cement are ground and calcined in a rotary kiln to produce cement clinkery which is then cooled rapidly in air. The cooled cement clinker is pulverized and classified to obtain cement particles having an average particle diameter of 60 $\mu$m or less using a tube mill or the like. The reason why the average particle diameter of the cement particles is adjusted to 60 $\mu$m or less is because the objective spheroidal cement finally obtained has an average particle diameter of about 40 $\mu$m or less if the cement particles used have an average particle diameter such as that described above. The spheroidal cement in its turn has an average particle diameter of preferably about 40 $\mu$m or less in order to sufficiently increase its flowability and filling properties. The average particle diameter of the cement particles is larger than that of the spheroidal cement because the spheroidizing treatment reduces the apparent average particle diameter of the cement particle as explained hereinbelow.

Next, the cement particles of an average particle size of 60 $\mu$m or less are supplied at a predetermined rate to a flame generation apparatus using as fuel a combustible gas such as propane, butane, propylene, acetone or hydrogen; a liquid fuel or petroleum such as heavy oil or kerosene; or a solid fuel such as oil coke, and the particles are passed through a high temperature flame generated by the apparatus. This converts the cement particles into a molten or semi-molten state. Thereafter, the particles are cooled rapidly in air.

By this procedure, the molten or semi-molten cement particles are spheroidized as illustrated in FIG. 1 due to their surface tension.

Suitable temperature of the high temperature flame varies depending on the type of cement, but is generally at least 1,300° C., preferably no lower than 1,500° C. If the temperature of the high temperature flame is below 1,300° C., the cement particles are not fully converted to a molten or semi-molten state, thus failing to spheroidize sufficiently. The retention time in the flame is preferably from about 0.01 to 0.02 second. When a fuel which contains a high ash content is used for the flame generation apparatus, it is necessary to adjust the amount of the raw materials for the production of cement so that the cement component be present in a predetermined amount.

Then, gypsum powder may be added to the spheroidal cement clinker in a proportion of up to about 5 parts by weight per 100 parts by weight of the spheroidal cement clinker so that the resulting composition is adjusted to have the desired hydraulic rate to obtain the spheroidal cement of the present invention. The addition of the gypsum powder in an amount of up to 5 parts by weight per 100 parts by weight of the spheroidal cement clinker, which is more than is usually used in the case of adjusting the hydraulic rate of an ordinary cement, is to replenish the gypsum lost due to thermal decomposition when it is heated to a temperature no lower than 1,300° C., and to enable the adjustment of the hydraulic rate of the cement which is similar to that of ordinary cement. It is preferred that the gypsum powder have an average particle diameter of about 80 $\mu$m or less so as to match the average particle size of the cement clinker in order to increase the flowability and filling properties of the resulting spheroidal cement.

The spheroidal cement of the present invention can also be prepared by passing through a high temperature flame a mixture of cement clinker conventionally obtained and gypsum powder in place of the cement clinker alone to calcine the mixture to convert it to a molten or semi-molten state. When rapidly cooled in air, the mixture gives an objective spheroidal cement without the further addition of gypsum powder. Both components of the mixture to be supplied in the high temperature flame in the thermal spheroidizing treatment, respectively, have an average particle diameter of about 60 $\mu$m or less. In this case, the temperature of the flame is the same as in the above-described case where the cement clinker alone is subjected to the thermal spheroidizing treatment. However, because gypsum is decomposed at a temperature no lower than 1,300° C., a little more gypsum powder than is used in the above-described variation must be blended with the cement clinker.

The gypsum powder may be a spheroidal gypsum powder. The spheroidal gypsum powder can be prepared by passing gypsum powder through a high temperature flame in the same manner as in the case of the production of the spheroidal cement or by subjecting gypsum to a spheroidizing treatment during its production procedure in a conventional manner.

In summary, the spheroidal cement of the present invention can be prepared by the following methods:

(1) a method comprising providing particles of Portland cement clinker and gypsum powder, the particles and the gypsum powder, respectively, preferably having an average particle diameter of 60 $\mu$m or less, passing the particles of the cement clinker through a high temperature flame to convert the particles into a molten or semi-molten state, rapidly cooling the molten or semi-molten particles to solidify them, and adding the gypsum powder to the solidified particles;

(2) a method comprising providing a mixture of particles of Portland cement clinker and gypsum powder, the particles and the gypsum powder, respectively, preferably having an average particle diameter of 6 $\mu$m or less, passing the mixture through a high temperature flame to convert it into a molten or semi-molten state, and rapidly cooling the molten or semi-molten mixture to solidify it; and (3) a method comprising providing particles of Portland cement clinker and a spheroidal gypsum powder, the particles and the spheroidal gypsum powder, respectively, preferably having an average particle diameter of 60 $\mu$m or less, passing the particles of the cement clinker through a high temperature flame to convert the particles into a molten or semi-molten state, rapidly cooling the molten or semi-molten particles to solidify them, and adding the spheroidal gypsum powder to the solidified particles.

The spheroidal cement of the present invention is composed essentially of particles having a substantially spherical shape and therefore has less interparticle frictional resistance. From this it follows that the spheroidal cement has a higher flow value than a conventional cement (non-spheroidal cement) at the same water/cement ratio (W/C ratio), which gives the cement improved flowability and filling properties no matter how it has been prepared. As a result, when the spheroidal cement of the present invention is used, a hardened mass of the cement has a sufficiently high strength.

(b) Granulating Treatment

The spheroidal cement of the present invention can also be prepared by a granulating treatment. More particularly, the spheroidal cement of the present invention can be prepared by providing fine particles of an inorganic material such as cement clinker or slag and gypsum powder, dispersing the fine particles of the inorganic material and an organic or inorganic binder in a non-aqueous solvent to form a slurry, granulating the slurry, and optionally adding an additive powder, to form spheroidal particles of said inorganic material having a predetermined particle diameter.

For example, the spheroidal cement of the present invention can be prepared by providing fine particles of cement clinker having a predetermined particle size and gypsum powder, dispersing the fine particles of the cement clinker and an organic or inorganic binder in a non-aqueous solvent to form a slurry, granulating the slurry to form spheroidal particles of the slurry having a substantially spherical shape, and adding the gypsum powder to the spheroidal particles of the cement clinker having a predetermined particle diameter.

Alternatively, the spheroidal cement of the present invention can be prepared by providing fine particles of cement clinker having a predetermined particle size, dispersing the fine particles of the cement clinker, the gypsum powder, and an organic or inorganic binder in a non-aqueous solvent to form a slurry, and granulating the slurry to form spheroidal particles of the slurry having a substantially spherical shape.

In both of the above methods above, raw materials for producing cement are ground and calcined in a rotary kiln in a conventional manner to produce cement clinker, which is then quenched or cooled rapidly in air. The cooled cement clinker is pulverized and classified so as to have an average particle diameter of about 10 $\mu$m or less, which is smaller than the conventional cement clinker. This is because the powder or fine particles of the cement to be obtained after the granulation have an average particle diameter of the same level as that of conventional cement powder.

Separately, a solvent is provided in an amount sufficient for the dispersal-therein of the fine particles of the cement clinker. A non-aqueous solvent (a solvent other than water) is used. Suitable examples of such non-aqueous solvents are one or more organic solvents selected from ethanol, methanol, benzene, acetone, toluene, xylene, glycols, ethers, and petroleum-derived solvents. For safety, ethanol is particularly preferred. When ethanol is used, it is desirable that it contain as little water as possible, e.g., having a purity of preferably no lower than 99.5%. The use of water as the solvent is undesirable because water reacts with the cement clinker to cause a hydration reaction. If a hydration reaction occurs at this stage the cement will lose its function as an active cement.

Next, the organic or inorganic binder is added to the solvent. As for the organic binder, one or more resins selected from polystyrenes, ABS resins, methacrylic resins, polyvinyl acetates, cellulose resins, polycarbonates, silicone resins, natural rubber derivatives, butadiene type synthetic rubbers, polyolefin type synthetic rubbers, chlorosulfonated polyethylenes, phenolic resins, urea resins, melamine resins, xylene resins, polyesters, epoxy resins, polyurethanes, polyamides, polyethylenes, polypropylenes, polyvinyl chlorides, AS resins, polyamides, polyacetals, polyethylene terephthalates (PET resins), polybutylene terephthalates (PBT resins), polyphenylene ethers, fluorine-containing resins, unsaturated polyesters, and polysulfate type synthetic rubbers can be used. The organic binder is added in an amount which depends on the type of the resin used, but generally is in a range of from about 0.1 to 5 parts by weight per 100 parts by weight of the cement clinker, whose particle size has been adjusted appropriately. If the organic binder is less than that amount, it is difficult to granulate the the slurry, while if it is more than that amount, the characteristics of the cement as final product deteriorate.

As for the inorganic binder, an alkoxylate type binder is used with preference. The alkoxylate type binder is obtained, for example, by dispersing an alkyl silicate such as ethyl silicate or methyl silicate in an alcohol such as ethanol or methanol and causing a dehydration reaction to occur between them. The inorganic binder is added in an amount which depends on the type of the resin used but generally is in a range of from about 0.1 to 5 parts weight per 100 parts by weight of the cement clinker whose particle size has been adjusted appropriately for the same reason as in the case of the organic binder.

Then, the cement clinker whose particle size has been adjusted appropriately is added to the solvent to disperse therein the fine particles thereof. On this occasion, the cement clinker is added in an amount such that the above-described blending ratio between the binder and the cement clinker is satisfied.

The solvent having dispersed therein the cement clinker and the binder is supplied to a granulator and granulated into spheroidal particles. As the granulator, various granulators such as a rotary rocking granulator, a fluidized bed-jet stream type mixer, a Henschel-type mixer, a pug mill type mixer, an Eilich-type mixer and the like can be used in the present invention.

The average particle diameter of the cement clinker obtained by the granulating treatment is preferably adjusted to from 20 to 30 μm. If the average particle diameter is below 20 μm, much water is needed and the strength of the cement decreases. On the other hand, if it exceeds 30 μm, the cement composition obtained by admixing the fine particles of the cement clinker with the gypsum powder has flowability and filling properties substantially equal to those of the conventional cement, thus losing the merits of rendering the cement spheroidal.

Subsequently, gypsum powder is added to the granulated cement clinker in an amount of from 0.5 to 5 parts by weight per 100 parts by weight of the granulated cement clinker so that the spheroidal cement can have a desired hydraulic rate. It is desirable that the gypsum have a particle diameter corresponding to that of the cement clinker. Hence, preferably, the gypsum has an average particle diameter of from about 20 to 30 μm. It is further preferred that the gypsum itself be spheroidal. For example, spheroidal gypsum obtained by a spheroidizing treatment during the procedure of producing gypsum can be used advantageously.

Alternatively, the gypsum powder may be added simultaneously together with the cement clinker and the binder to the solvent so that it can be already contained in the granulated particles. In this case, it is preferable to adjust the gypsum powder so as to have an average particle diameter of about 10 μm or less, in order to appropriately adjust the particle size of the spheroidal cement to be obtained after the granulating treatment. According to the simultaneous dispersion method, more uniform spheroidal cement can be obtained than by the addition of the gypsum powder to the granulated particles of the slurry.

Furthermore, it is possible to first add the cement clinker to the solvent and then add the binder to the resulting dispersion.

According to the present invention, a spheroidal cement can be obtained not only with Portland cement but also with various other cements such as alumina cement, high early strength Portland cement, moderate heat Portland cement, ultra-high early strength Portland cement, and jet cement.

The spheroidal cement produced by the above-described methods including the step of granulating treatment, like those prepared by methods including the step of thermal spheroidizing treatment, has a substantially spherical shape and thus a low interparticle frictional resistance, which means a higher flow value at the same water/cement ratio. Therefore, the spheroidal cement prepared by the above-described methods also has increased flowability and filling properties; as a result, when it is hardened, the mass of hardened cement has a mechanical strength higher than that obtained by conventional non-spheroidal cement.

II. Preparation of Spheroidal Slag

The spheroidal slag of the present invention can be prepared, from a conventional slag in the form of a mass or sand by-produced in a furnace for smelting, for example, and ground to have a suitable particle size, i.e., an average particle diameter of about 40 μm or less (e.g., a particle diameter range of from 15 to 55 μm) and optionally admixed with gypsum or the like, essentially in the same manner as the spheroidal cement except that the temperature of the high temperature flame, which depends on the type of the slag, is generally no lower than 1,000° C. If that temperature is lower than 1,000° C., it is difficult to convert the particles of the slag into a molten or semi-molten state, so that they fail to be spheroidized sufficiently. The spheroidal slag thus obtained is composed essentially of particles of a substantially spherical shape and thus has a low interparticle frictional resistance. Therefore, the spheroidal slag has better flowability than a conventional non-spheroidal slag and its filling properties can be improved by particle size control.

III. Preparation of Spheroidal Slag Cement

The spheroidal slag cement of the present invention comprises spheroidal slag, cement clinker which has been pulverized and may be spheroidal, and gypsum which has been pulverized and may be spheroidal. The spheroidal slag cement can be prepared by providing particles of, for example, Portland cement clinker and particles of Portland blast furnace slag powder, both particles preferably having an average particle diameter of 60 μm or less, passing the particles of the slag powder and optionally the particles of the cement clinker through a high temperature flame to convert the particles into a molten or semi-molten state, rapidly cooling the molten or semi-molten particles to solidify them, adding gypsum powder which may be composed of spheroidal particles and optionally particles of cement clinker to the solidified particles.

According to the present invention, the cement clinker used is not limited to Portland cement, rather, various other cement clinkers can be used, examples of which include alumina cement clinker, high early strength Portland cement clinker, moderate heat Portland cement clinker, ultra-high early strength Portland cement clinker, and jet cement clinker.

Thus, either the slag alone or a mixture of the cement clinker and the slag is subjected to a thermal spheroidizing treatment, which may be carried out essentially in the same manner as in the case where the spheroidal cement is prepared by the thermal spheroidizing treatment (a) described above. The particles of the cement clinker are prepared in the same manner as those used in the spheroidal cement described above except that the cement clinker is replaced by slag powder alone or a mixture of the slag powder and particles of cement clinker. When both slag powder and cement clinker are to be passed through the high temperature flame, both particles are supplied at a blend ratio in the range of from 10:90 to 90:10 by weight.

As at least the slag is subjected to the thermal spheroidizing treatment, the same conditions, including flame temperature, retention time and particle size used in the preparation of the spheroidal slag may be used for the preparation of the spheroidal slag cement.

After the cooling, gypsum powder preferably having an average particle diameter of about 40 $\mu$m or less is added to the resulting spheroidal slag plus spheroidal cement clinker, if present, in an amount of up to 10 parts by weight per 100 parts by weight of the sum of the spheroidal slag and spheroidal cement clinker. The gypsum powder may be a spheroidized gypsum powder prepared by the same thermal spheroidizing treatment used in the preparation of the spheroidal cement clinker and of the spheroidal slag or by conventional spheroidizing treatment during the procedure of producing the gypsum. Also, cement clinker preferably having an average particle diameter of about 40 $\mu$m or less may be added to the resulting spheroidal slag plus spheroidal cement clinker, if present, in an amount of from about 10 to 900 parts by weight per 100 parts by weight of the sum of the spheroidal slag plus spheroidal cement clinker. It is preferred that the cement clinker to be added after the cooling be spheroidal cement clinker prepared by the thermal spheroidizing treatment described above.

More specifically, the spheroidal slag cement of the present invention can be prepared by one of the following methods:

(1) a method comprising providing particles of Portland cement clinker, particles of Portland blast furnace slag powder, and gypsum powder, both particles and gypsum powder, respectively, preferably having an average particle diameter of 60 $\mu$m or less, passing the particles of the slag powder and a portion of the particles of the cement clinker through a high temperature flame to convert both types of particles into a molten or semi-molten state, rapidly cooling the molten or semi-molten particles to solidify them, and adding the gypsum powder and the portion of the particles of the cement clinker not passed through the high temperature flame to the solidified particles;

(2) a method comprising providing particles of Portland cement clinker, particles of Portland blast furnace slag powder, and gypsum powder, both particles and the gypsum powder, respectively, preferably having an average particle diameter of 60 $\mu$m or less, passing the particles of the slag powder and the particles of the cement clinker through a high temperature flame to convert both types of particles into a molten or semi-molten state, rapidly cooling the molten or semi-molten particles to solidify them, and adding the gypsum powder to the solidified particles;

(3) a method comprising providing particles of Portland cement clinker, particles of Portland blast furnace slag powder, and gypsum powder, both particles and the gypsum powder, respectively, preferably having an average particle diameter of 60 $\mu$m or less, passing the particles of the slag powder through a high temperature flame to convert the particles to a molten or semi-molten state, rapidly cooling the molten or semi-molten particles to solidify them, and adding the gypsum powder and the particles of the cement clinker to the solidified particles;

(4) a method comprising providing particles of Portland cement clinker, particles of Portland blast furnace slag powder and a spheroidal gypsum powder, both particles and the gypsum powder, respectively, preferably having an average particle diameter of 60 $\mu$m or less, passing the particles of the slag powder and a portion of the particles of the cement clinker through a high temperature flame to convert the particles to a molten or semi-molten state, rapidly cooling the molten or semi-molten particles to solidify them, and adding the spheroidal gypsum powder and the other portion of the particles of cement clinker to the solidified particles;

(5) a method comprising providing particles of Portland cement clinker, particles of Portland blast furnace slag powder, and a spheroidal gypsum powder, both particles and the gypsum powder, respectively, preferably having an average particle diameter of 60 $\mu$m or less, passing the particles of the slag powder and the particles of the cement clinker through a high temperature flame to convert the particles to a molten or semi-molten state, rapidly cooling the molten or semi-molten particles to solidify them, and adding the spheroidized gypsum powder to the solidified particles; and (6) a method comprising providing particles of Portland cement clinker, particles of Portland blast furnace slag powder, and a spheroidal gypsum powder, both particles and the gypsum powder, respectively, preferably having an average particle diameter of 60 $\mu$m or less, passing the particles of the slag powder through a high temperature flame to convert the particles of the slag powder to a molten or semi-molten state, rapidly cooling the molten or semi-molten particles to solidify them, and adding the spheroidal gypsum powder and the particles of the cement clinker to the solidified particles.

IV. Preparation of Quick-Hardening Portland Cement

The quick-hardening spheroidal Portland cement of the present invention comprises (a) spheroidal cement clinker containing as a quick-hardening component a compound represented by the formula $11CaO \cdot 7Al_2O_3 \cdot CaX_2$, where X represents a fluorine atom or a chlorine atom, and (b) a Portland cement which may be spheroidal.

The quick-hardening spheroidal Portland cement of the present invention can be prepared essentially in the same manner as the spheroidal cement described above except that the raw materials used include cement clinker containing a compound represented by the formula $11CaO \cdot 7Al_2O_3 \cdot CaX_2$, where X represents a fluorine atom or a chlorine atom as a quick-hardening component, in addition to ordinary Portland cement. However, the temperature of the high temperature flame used for spheroidizing the particles of the cement clinker is preferably from 1,000° to 1,200° C. This is because the quick-hardening component, represented by the formula $11CaO \cdot 7Al_2O_3 \cdot CaX_2$, where X represents a fluorine atom or a chlorine atom, is produced at a temperature lower than the respective production temperatures of other components. It is preferred that the spheroidal cement clinker have an average particle diameter of about 40 $\mu$m or less, which is larger than conventional non-spheroidal clinkers, in order to fully increase the flowability of the spheroidal cement clinker. The reason why the spheroidal clinker particles having an average particle diameter larger than that of the ordinary cement particles are acceptable is that the specific surface area of the particles decreases, which makes the apparent average particle diameter smaller.

It is preferred that the quick-hardening component be contained in an amount such that the component is present in a blend ratio of from 1 to 30% by weight based on the total weight of the spheroidal particulate inorganic material.

The Portland cement may be a conventional one. However, it is preferable to spheroidize it in the same manner as the spheroidal cement described above before use. The average particle diameter of the spheroidal Portland cement is preferably about 40 μm or less so as to match that of the spheroidal clinker containing the quick-hardening component.

The spheroidal quick-hardening Portland cement of the present invention has an improved flow value and increased flowability, thus filling properties can be controlled. A hardened mass obtained from this quick-hardening Portland cement has increased strength, which avoids the decrease of strength, in spite of the addition of a retarder, in order to control the hardening time.

V. Preparation of Inorganic Composition for Use in Civil Engineering Works or Construction The above-described spheroidal cement, spheroidal quick-hardening Portland cement and spheroidal slag of the present invention can be used for preparing various inorganic compositions for use in construction or building or civil engineering works.

The inorganic compositions of the present invention include those for ground stabilization, i.e., ground stabilizers, for example, a ground improver and a ground solidifier; and those for use as concrete or mortar work materials. The inorganic compositions of the present invention may also include those which contain one or more organic substances as a component or components.

The ground stabilizers are roughly classified into the materials listed below. The spheroidal particulate inorganic materials of the present invention, such as spheroidal cement, spheroidal quick-hardening Portland cement and spheroidal slag, are added to the materials listed below in predetermined amounts or used as components therein.

(1) Portland cement, mixed cement, and mixtures composed of such cement, as a basic material, and one or more active ingredients for stabilization.

(2) Quick lime (calcium oxide), slaked lime (calcium hydroxide), and mixtures of these, as a basic material, and one or more of pozzolan, gypsum and the like as active ingredients.

(3) Bituminous substances (4) Chemical materials such as organic cement materials, soluble salts, surfactants, etc.

(5) Combinations of one or more of (1) to (4) above.

On the other hand, the materials for use in concrete or mortar works include, for example, admixtures or adjuvants, grout materials, plastering materials and the like. The spheroidal particulate inorganic materials of the present invention, such as spheroidal cement, spheroidal slag cement, or spheroidal slag, are added thereto or used as components thereof in predetermined amounts.

(a) Admixtures (adjuvants): These are materials which are mixed in relatively large amounts with concrete upon kneading in order to improve its quality or endow it with special characteristics. The admixtures include those which exhibit chemical effects by a chemical reaction with calcium hydroxide formed as a result of the hydration reaction of the cement used and those which exhibit physical effects. The present invention is applicable to both types.

(b) Grout materials: Grout materials are used for reinforcing ground or rocks, stopping water exudation, filling cavities, and the like. They include cement types, water glass types (suspension type, solution type (inorganic or organic), and the like.

(c) Plastering materials: These are materials used for coating, spraying and the like, and include, for example, lime, cement, plasters, magnesia cement, clay, color sand, and the like.

(d) Aggregate: Aggregate is an inactive material to be kneaded together with cement and water for producing concrete or mortar. The present invention is applied particularly to crushed slag composed of slowly cooled Portland blast furnace slag.

The spheroidal particulate inorganic material contained in the inorganic composition of the present invention decreases the interparticle frictional resistance of the inorganic composition and hence improves the flowability thereof as compared with conventional materials containing fly ash, for example. The particle size control of the spheroidal particulate inorganic material improves its filling properties; as a result, the inorganic compositions for use in civil engineering works and the like also have excellent flowability and improved filling properties. Because the spheroidal particulate inorganic material used is less expensive than the conventional organic adjuvants, for example, the cost incurred in civil engineering works can be reduced considerably.

Apparatus for Producing Spheroidal Particulate Inorganic Material

Now, referring to FIGS. 2 and 3, the apparatus for producing a spheroidal particulate inorganic material according to one embodiment of the present invention will be explained in greater detail hereinbelow.

Figure 2:
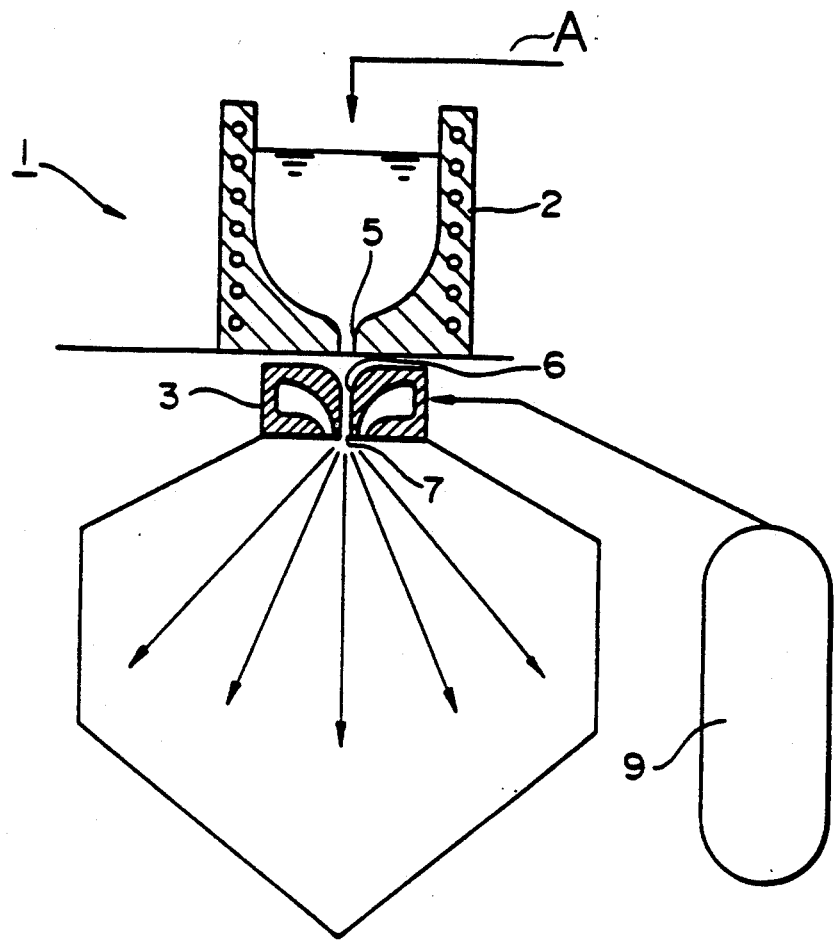
FIG. 2 is a schematic vertical cross-section of the apparatus for producing a spheroidal particulate inorganic material such as spheroidal cement or spheroidal slag according to one embodiment of the present invention.
Figure 3:
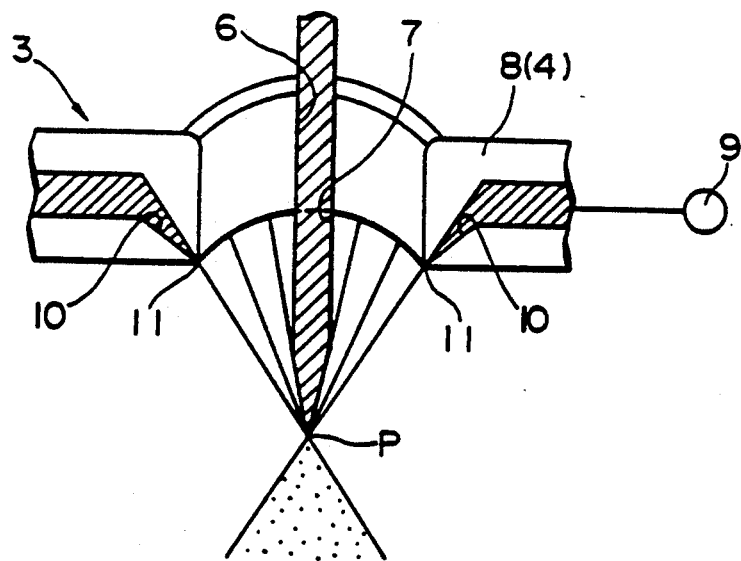
FIG. 3 is a schematic vertical cross-section of the nozzle used in the apparatus illustrated in FIG. 2.

FIG. 2 is a schematic vertical cross-section of the apparatus for producing a spheroidal particulate inorganic material such as spheroidal cement or spheroidal slag according to one embodiment of the present invention, and FIG. 3 is a schematic vertical cross-section of the nozzle assembly used in the apparatus illustrated in FIG. 2.

First, the apparatus for producing a spheroidal particulate inorganic material of the present invention will be explained as applied to the production of spheroidal slag. In FIG. 2, reference numeral 1 denotes generally an apparatus for producing spheroidal slag. The apparatus 1 has a retention furnace 2, a nozzle assembly 3 communicated to the retention furnace 2 and jet means 4 provided in the nozzle assembly 3.

The retention furnace 2 receives molten, liquid slag discharged in a liquid state from a blast furnace (not shown) or liquid slag melted using a high frequency melting furnace (not shown) or a burner (not shown) and retains the molten slag in a molten state. For this purpose, the retention furnace 2 is provided with heating means such as a high frequency heater or an electric heater so that it can keep the inside temperature of the furnace at a level of about 1,000° to about 1,200° C. The retention furnace 2 has an outlet hole 5 formed on the bottom thereof so as to penetrate it vertically.

The nozzle assembly 3 is arranged just below the retention furnace 2 in such a manner that it is communicated to the outlet hole 5, preferably concentrically as illustrated in FIG. 2. As illustrated in FIG. 3, the nozzle assembly 3 has a passage 6 in the center thereof which is communicated to the outlet hole 5, and serves to pass the liquid slag. On the tip or lowermost part of the passage 6 is provided an outlet 7 for the molten slag. The nozzle assembly 3 may be fitted directly on the bottom of the retention furnace 2 or indirectly through a flow tube (not shown) for the liquid. The passage 6 communicating to the outlet hole 5 may be designed such that it allows the molten slag to pass therethrough and go out of the retention furnace 2 either freely by gravity or jetted forcibly under pressure. When the nozzle assembly 3 is fitted to the retention furnace directly, the flow tube is provided with heating means or heat retaining means (not shown) such as a heater or the like to retain the molten slag in a liquid state. Furthermore, the nozzle assembly 3 is provided with a sprayer 8 for introducing a spray gas. The sprayer 8 corresponds to the jet means 4 referred to above.

As illustrated in FIG. 3, the sprayer 8 (jet means 4) includes a spray gas source 9 for supplying a spray gas such as pressurized nitrogen gas or compressed air, a plurality of spray nozzles 10 for spraying the spray gas supplied from the spray gas source 9, and a control device (not shown) for controlling the flow rate and flow speed of the spray gas. Each of the spray nozzles 10 has an outlet 11 on the top thereof, and the respective outlets 11 are opened in a direction such that the respective axes of the plural outlets 11 concentrate on a single point P, which is located on an imaginary line or axis extending through the center of the outlet 7 of the passage 6 in the nozzle assembly 3 as illustrated in FIG. 3. The spray nozzles 10 are arranged around the passage 6 symmetrically (in point symmetry). The control device (not shown) may be any conventional flow rate control means that includes a needle valve or the like for controlling the flow rate of the pressurized gas.

In this embodiment, a single outlet hole is provided through the bottom of the retention furnace 2 and correspondingly a single nozzle assembly is provided. Of course, a plurality of outlet holes and a corresponding number of nozzle assemblies can be used.

With the apparatus 1 described above, the spheroidal slag of the present invention can be prepared as follows.

Firstly, a molten slag such as the one discharged from a blast furnace is supplied to the retention furnace 2 or a solid slag is supplied to the retention furnace 2, where the slag is melted to obtain a molten slag.

Then the molten slag is passed through the outlet hole 5 and the passage 6 of the nozzle assembly 3 and jetted through the outlet 7. At the same time, a spray gas is sprayed from the spray nozzles 10, while controlling its flow rate and flow speed in accordance with the flow rate and flow speed of the molten slag being discharged through the outlet 7 such that the molten slag can be divided into particles which have a desired size (particle diameter) and a desired shape (degree of spheroidization, i.e., degree indicating how close the particles are to true spheres). Preferably, the control of the spray gas is performed by determining the flow rate and flow speed based on data on the relationship between the flow rate and flow speed of the spray gas and degree of solidification and degree of spheroidization of the molten slag obtained by experiments conducted beforehand.

When the spray gas is sprayed in the manner described above, the molten slag discharged through the outlet 7 comes in contact with the spray gas at the point P located in an imaginary extension line along the axis of the passage 6, becomes entrained by the spray gas, and is scattered in the form of a cone as shown in FIG. 3, thus becoming cooled rapidly in air to solidify, thus forming spheroidal particles. That is, the molten slag forms minute droplets when scattered while entrained by the spray gas, which droplets are cooled rapidly or quenched to solidify and come to have a substantially spherical shape or are spheroidized. As for the solidified spheroidal slag particles, those closer to true spheres are more preferable in view of the flowability and filling properties of the slag particles. The average particle diameter of the spheroidal slag particles is preferably from 10 to 50 $\mu$m from the viewpoint of the flowability and filling property thereof.

The apparatus 1 can also be used for producing spheroidal cement. In this case, the apparatus 1 receives in the retention furnace 2 molten cement clinker obtained by appropriate heating means, such as an electric oven or heater.

Figure 4:
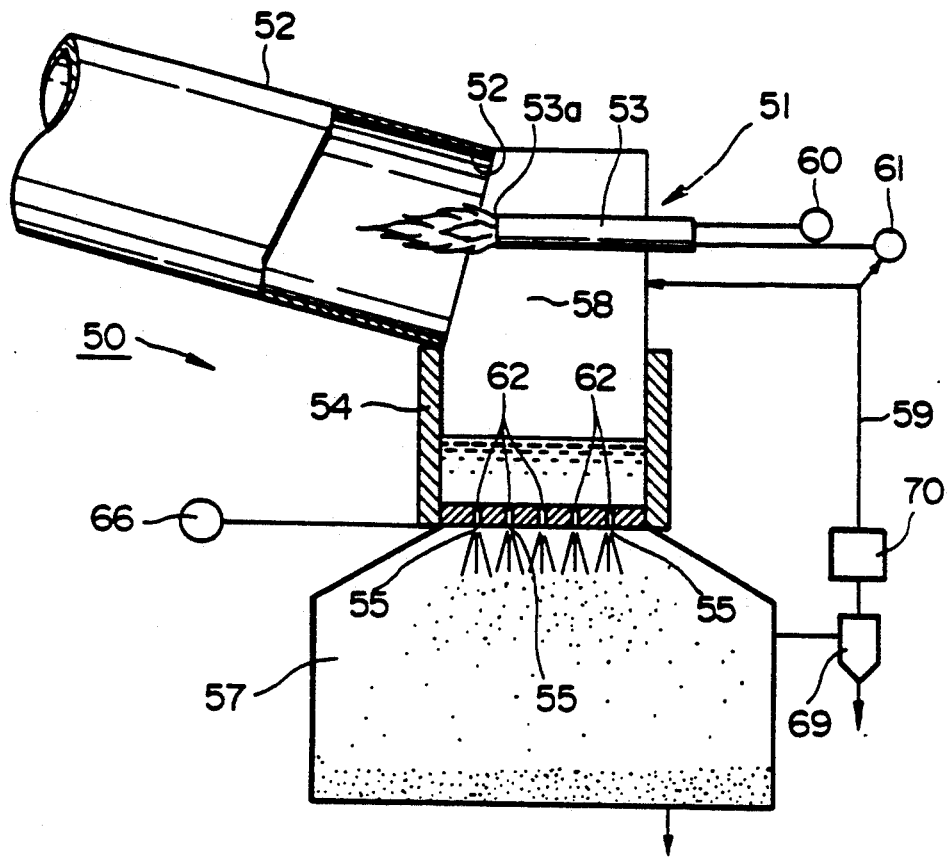
FIG. 4 is a schematic partial cross-section of the apparatus for producing spheroidal cement according to another embodiment of the present invention.

FIG. 4 illustrates schematically the apparatus for producing a spheroidal particulate inorganic material according to another embodiment of the present invention. While the apparatus can be used for producing both the spheroidal cement and spheroidal slag of the present invention described above, an explanation will be given hereinbelow of the use of the apparatus in the production of the spheroidal cement of the present invention.

In FIG. 4, reference numeral 51 denotes generally the apparatus for producing spheroidal cement according to the present invention. The apparatus 51 basically includes a rotary kiln 52, a burner 53 which is arranged near an outlet 52a of the rotary kiln 52 and generates a high temperature flame in the outlet 52a, a retention furnace 54 for receiving cement clinker supplied from the rotary kiln 52 and retaining it therein in a molten or semi-molten state, a nozzle assembly 55 communicated to the retention furnace 54, spray means 56 which is provided in the nozzle assembly 55 and sprays the molten or semi-molten cement, a storage room 57 provided at the bottom of the retention furnace 54 for storing the spheroidal cement produced, a guide passage 58 which is communicated both to the outlet 52a and to the retention furnace 54 and guides therethrough the molten or semi-molten cement formed upon contact with the high temperature flame, and a feedback pipe 59 communicated from the storage room 57 to the guide passage 58.

The rotary kiln 52 is arranged downstream of a suspension preheater (not shown) and calcines raw material powder preheated and calcinated in the suspension preheater (not shown). The rotary kiln 52 is provided with the burner 53 on the discharge side thereof. The burner 53 uses as a fuel a combustible gas such as propane, butane, propylene, acetone or hydrogen; a liquid fuel or petroleum such as heavy oil or kerosene; or a solid fuel such as oil coke. The fuel and a combustion aid gas such as oxygen or air are supplied through a burner tip 53a of the burner to generate a high temperature flame. On the side opposite to the burner tip 53a are provided a fuel supply portion 60 and an introductory portion 61 for the combustion aid gas. The burner 53 is arranged so that the burner tip 53a faces the outlet 52a of the rotary kiln 52 and the flame can be generated within the outlet 52a. The flame generated converts the cement clinker discharged from the rotary kiln 52 into a molten or semi-molten state.

The retention furnace 54 receives cement clinker which is discharged from the rotary kiln 52 in a molten or semi-molten state and retains the cement clinker in a molten or semi-molten state. For this purpose, the retention furnace 54 is provided with heating means such as a high frequency heater or an electric heater so that it can keep the inside temperature of the furnace at a level of about 1,000° to about 1,600° C. The retention furnace 54 has an outlet hole 62 formed on the bottom thereof so as to penetrate it vertically.

FIG. 4 illustrates schematically the apparatus for producing a spheroidal particulate inorganic material according to another embodiment of the present invention. While the apparatus can be used for producing both the spheroidal cement and spheroidal slag of the present invention described above, an explanation will be given hereinbelow on the use of the apparatus in the production of the spheroidal cement of the present invention.

In FIG. 4, reference numeral 50 denotes generally the apparatus for producing spheroidal cement according to the present invention. The apparatus 50 basically includes the same elements as used in the conventional apparatus for producing cement, i.e., such elements as a cement kiln or a rotary kiln, a suspension preheater, a cooler, etc., and in addition thereto a spheroidization mechanism 51 for spheroidizing cement clinker. Thus, the spheroidization mechanism 51 includes a rotary kiln 52, a burner 53 which is arranged near an outlet 52a of the rotary kiln 52 and generates a high temperature flame in the outlet 52a, a retention furnace 54 for receiving cement clinker supplied from the rotary kiln 52 and retaining it therein in a molten or semi-molten state, a plurality of nozzle assemblies 55 communicated to the retention furnace 54, a plurality of spray means 56 which are provided in the respective nozzle assemblies 55, a storage room 57 provided at the bottom of the retention furnace 54 for storing the spheroidal cement clinker produced, a guide passage 58 which is communicated both to the outlet 52a and to the retention furnace 54 and guides therethrough the molten or semi-molten cement clinker formed upon contact with the high temperature flame, and a feedback pipe 59 communicated both to the storage room 57 and to the guide passage 58.

The rotary kiln 52 is arranged downstream of a suspension preheater (not shown) and calcines powders of raw material preheated and calcinated in the suspension preheater. The burner 53 is provided on the discharge side of the rotary kiln 52. The burner 53 uses as fuel a combustible gas such as propane, butane, propylene, acetone or hydrogen; a liquid fuel or petroleum such as heavy oil or kerosene; or a solid fuel such as oil coke. The fuel and a combustion aid gas such as oxygen or air are supplied through a burner tip 53a of the burner 53 to generate a high temperature flame. On the side opposite to the burner tip 53a are provided a fuel supply portion 60 and an inlet portion 61 for the combustion aid gas. The burner 53 is arranged so that the burner tip 53a faces the outlet 52a of the rotary kiln 52 and so that the flame can be generated within the outlet 52a. The cement clinker discharged from the rotary kiln 52 is heated and converted into a molten or semi-molten state when in contact with the flame.

The retention furnace 54 receives cement clinker which is discharged from the rotary kiln 52 in a molten or semi-molten state and retains the cement clinker in a molten or semi-molten state. For this purpose, the retention furnace 54 is provided with heating means, such as a high frequency heater or an electric heater, so that it can keep the inside temperature of the furnace at a level of about 1,000° to about 1,600° C. The retention furnace 54 has a plurality of outlet holes 62 formed on the bottom thereof such that they penetrate it vertically.

Figure 5:
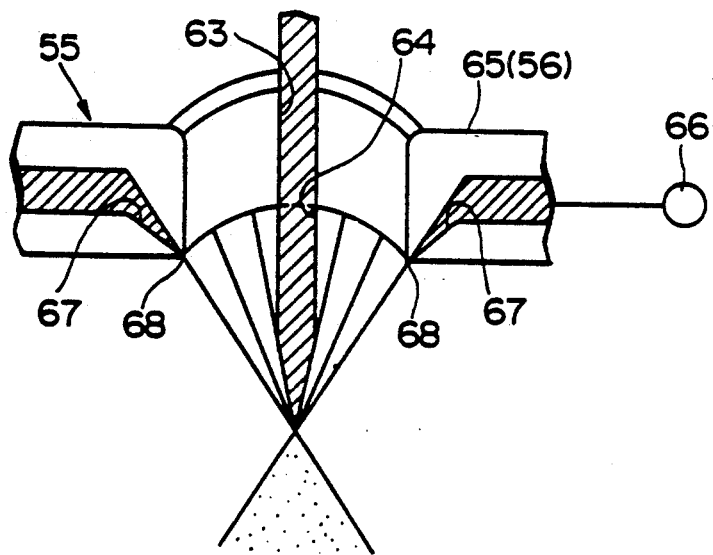
FIG. 5 is a schematic vertical cross-section of the nozzle used in the apparatus illustrated in FIG. 4.

The nozzle assemblies 55 are arranged just below the retention furnace 54 such that they are communicated to the respective outlet holes 62. FIG. 5 illustrates one of the nozzle assemblies 55 in detail. The nozzle assembly 55 may have the same construction as the nozzle assembly illustrated in FIG. 3. As illustrated in FIG. 5, each nozzle assembly 55 has a passage 63 in the center thereof which is communicated to the outlet hole 62, and serves to pass the molten or semi-molten cement clinker. On the tip or lowermost part of the passage 63 is provided an outlet 64 for the molten or semi-molten cement clinker. The nozzle assembly 55 may be fitted directly on the bottom of the retention furnace 54 or indirectly through a flow tube (not shown) for the molten or semi-molten cement clinker. The passage 63 communicating to the outlet hole 62 may be designed such that it allows the molten or semi-molten cement clinker to pass therethrough and go out of the retention furnace 54 either freely by gravity or jetted forcibly under pressure. When the nozzle assembly 55 is fitted to the retention furnace directly, the flow tube (not shown) is provided with heating means or heat retention means (not shown) such as a heater or the like to retain the cement clinker in a molten or semi-molten state. Furthermore, the nozzle assembly 55 is provided with a sprayer 65 for introducing a spray gas. The sprayer 65 corresponds to the jet means 56 referred to above.

As illustrated in FIG. 4, the sprayer 65 (jet means 56) includes a spray gas source 66 for supplying a spray gas such as pressurized nitrogen gas or compressed air, a plurality of spray nozzles 67 (FIG. 5) for spraying the spray gas supplied from the spray gas source 66, and a control device (not shown) for controlling the flow rate and flow speed of the spray gas. Each of the spray nozzles 67 has an outlet 68 on the top thereof and the respective outlets 68 are opened in a direction such that the respective axes of the plural outlets 68 concentrate on a single point P which is located on an imaginary line or axis extending through the center of the outlet 64 of the passage 63 in the nozzle assembly 55 as illustrated in FIG. 5. The spray nozzles 67 are arranged around the passage 63 symmetrically (in point symmetry). The control device (not shown) may be any conventional flow rate control means that includes a needle valve or the like for controlling the flow rate of the pressurized gas.

Below the retention furnace 54 is provided the storage room 57. The storage room 57 receives both the cement clinker and spray gas jetted from the nozzles 67 and stores the rapidly cooled cement clinker therein until it is introduced in to a storage tank (not shown). On a side wall of the storage room 57 is provided the feedback pipe or route 59. The feedback pipe 59 has a separator 69 and a fan 70 therein. The feedback pipe 59 is communicated to the retention furnace 54 through the guide passage 58. By the action of the blast fan 69, exhaust gas in the storage room 57 is absorbed and the cement clinker entrained thereby is separated in the separator 70. Thereafter, the exhaust gas is fed back to the guide passage 58. The cement clinker separated from the exhaust gas is then introduced in the storage tank (not shown) where it is combined with the cement clinker from the storage room 57.

In this embodiment, a plurality of outlet holes 62 are provided through the bottom of the retention furnace 54 and correspondingly a plurality of nozzle assemblies are provided. Of course, the numbers of the outlet holes and of the nozzle assemblies can be selected appropriately.

With the apparatus 50 described above, the spheroidal cement of the present invention can be prepared as follows.

Firstly, cement clinker calcined in the rotary kiln 52 is passed through a high temperature flame from the burner 53 at the outlet 52a of the rotary kiln to convert the cement clinker to a molten or semi-molten state and is supplied to the retention furnace 54, where it is retained in a molten or semi-molten state.

Then the cement clinker is passed through the outlet holes 62 and the respective passages 63 of the nozzle assemblies 55 and jetted through the respective outlets 64. At the same time, a spray gas is sprayed from the spray nozzles 67 while controlling its flow rate and flow speed in accordance with the flow rate and flow speed of the molten or semi-molten cement clinker being discharged through the outlets 64 such that the molten or semi-molten cement clinker can be divided into particles which have a desired size (particle diameter) and a desired shape (degree of spheroidization, i.e., degree indicating how close the particles are to true spheres). Preferably, the control of the spray gas is performed by determining the flow rate and flow speed based on data on the relationship between the flow rate and flow speed of the spray gas and degree of solidification and degree of spheroidization of the molten or semi-molten cement clinker obtained by experiments conducted beforehand.

When the jet gas is sprayed in the manner described above, the molten or semi-molten cement clinker discharged through the outlets 64 comes in contact with the spray gas at the point P located on an imaginary extension line along the axis of the passage 63 and is entrained by the spray gas, scattered in the form of a cone as shown in FIG. 5, and cooled rapidly in air to solidify to form spheroidal particles. That is, the molten or semi-molten cement clinker forms minute droplets when scattered while entrained by the spray gas, which are cooled rapidly to solidify and come to have a substantially spherical shape or are spheroidized. As for the solidified spheroidal cement clinker particles, those having a shape closer to true spheres are more preferable in view of the flowability and filling properties of the cement clinker particles. The average particle diameter of the spheroidal cement clinker particles is preferably from 10 to 50 $\mu$m from the viewpoint of the flowability and filling properties thereof.

The blast fan is actuated while the above-described procedures are being operated. This causes the cement clinker to be jetted together with the spray gas; as a result, a portion of the spray gas which is heated to a high temperature upon contact with the molten or semi-molten cement clinker is absorbed into the feedback pipe 69. After separating the entrained cement clinker, the gas is fed back to the guide passage 58. Therefore, the cement clinker heated to a molten or semi-molten state by the burner 53 retains its temperature and is still kept in a molten or semi-molten state by the above-described high temperature feedback gas (a portion of the spray gas) without being cooled in the guide passage 58 on the way to the retention furnace 54, and is introduced into the retention furnace 54 in that state.

Thereafter, the cement clinker obtained is taken from the storage room 57, and a suitable amount of gypsum powder is mixed therewith to obtain cement.

The apparatus 50 now makes it possible not only to produce spheroidal cement but also to reduce heat consumption because the molten or semi-molten cement clinker is introduced into the retention furnace while keeping its temperature by means of the fed back gas, which avoids the re-melting of once-solidified cement clinker. Therefore, the use of the apparatus of the present invention reduces the total energy cost considerably.

While a rotary kiln is used in the above-described embodiment, a vertical furnace can also be used in place of the rotary kiln. In order to convert the cement clinker to a molten or semi-molten state, various conventional heating means other than the burner may also be used.

Figure 6:
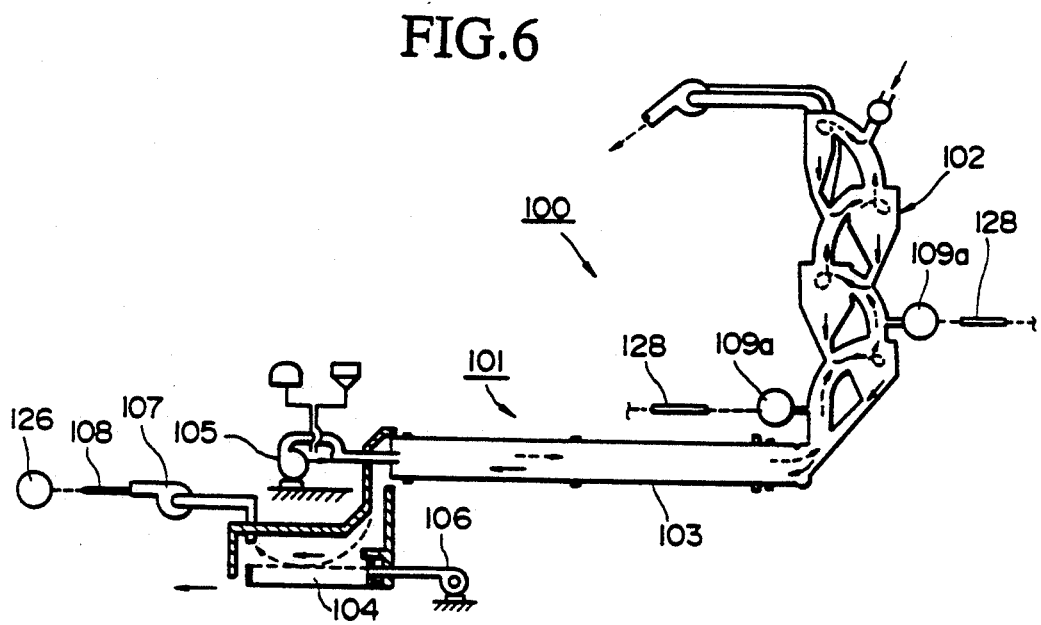
FIG. 6 is a schematic vertical cross-section of the apparatus for producing a spheroidal particulate inorganic material such as spheroidal slag or spheroidal cement according to still another embodiment of the present invention.
Figure 7:
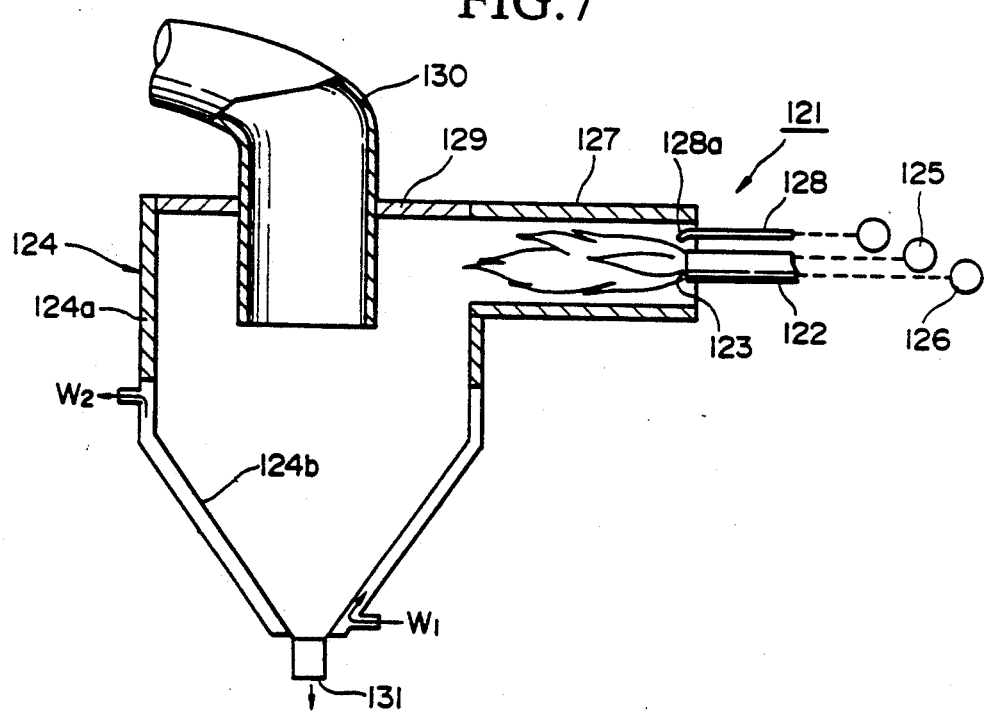
FIG. 7 is a side cross-section of the apparatus for generating a high temperature flame used in the apparatus illustrated in FIG. 6.
Figure 8:
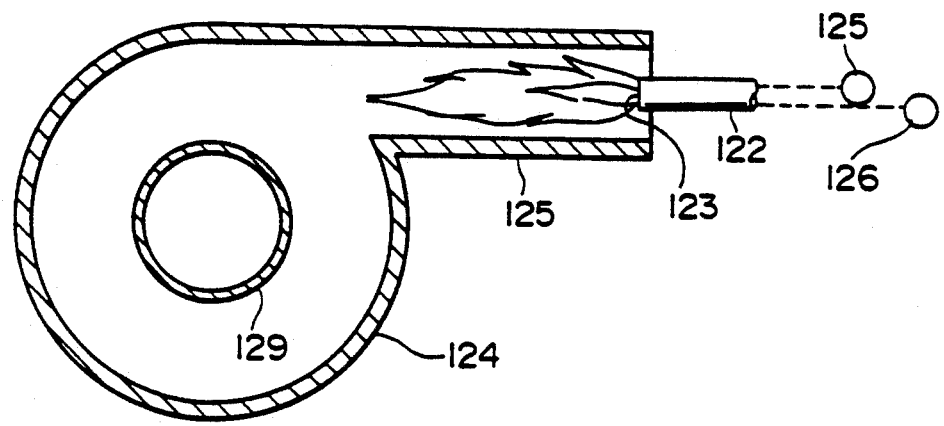
FIG. 8 is a transverse cross-section of the apparatus for generating a high temperature flame illustrated in FIG. 7.

FIGS. 6 to 8 illustrate an apparatus for producing a spheroidal particulate inorganic material such as spheroidal slag or spheroidal cement according to still another embodiment of the present invention, in which the spheroidal particulate inorganic material such as spheroidal cement or spheroidal slag is produced by supplying exhaust gas from the cooler of the cement kiln as a combustion aid gas to the burner for generating a high temperature flame and by supplying exhaust gas from the burner to the preheater of the cement kiln.

In FIGS. 6 to 8, reference numeral 100 denotes an apparatus for producing a spheroidal particulate inorganic material, which includes a cement kiln 101 and a spheroidizing mechanism in the form of a high temperature flame generator 121. The cement kiln 101 used in this embodiment is an SP kiln which has a suspension preheater 102 for preheating the powder of a raw material for producing spheroidal particulate inorganic material, typically spheroidal cement or spheroidal slag, a rotary kiln 103 installed downstream of the suspension preheater 102, and a cooler 104 disposed downstream of the rotary kiln 103. The powder of the raw material is preheated and calcinated in the preheater 102 and then supplied to the rotary kiln 103 where it is calcined and then sent to the cooler 104 in which it is cooled.

In the apparatus illustrated in FIG. 6, an exhaust wind mill 105 is provided downstream of the rotary kiln 103. The exhaust wind mill 105 introduces hot air into the rotary kiln 103 to calcine the powder of the raw material. The hot exhaust gas, after contacting the powder of the raw material upon the calcination thereof, is itself cooled and is introduced into the preheater 102 in a cooled state. However, the exhaust gas from the rotary kiln is still hot to some extent and preheats fresh powder of the raw material in the preheater 102. On the other hand, the cooler 105 is provided upstream thereof with a blow-in wind mill 106 for cooling. Cool air introduced in from the blow-in wind mill 106 quenches or rapidly cools hot calcined powder calcined in and fed from the rotary kiln 103. The air, having contacted the calcined powder, is heated and exhausted in a hot state from the exhaust wind mill 107 arranged downstream of the cooler 104, and is fed to the high temperature flame generator 121 through a conduit 108 communicated to the exhaust wind mill 107, as explained later.

On the other hand, the flame generator 121 includes a burner 122 having a nozzle 123. On the side of the nozzle 123 is provided a cyclone 124. The burner 122 forms a high temperature flame which is formed by burning as a fuel a combustible gas such as propane, butane, propylene, acetone or hydrogen; a liquid fuel or petroleum such as heavy oil or kerosene; or a solid fuel such as oil coke. The fuel is supplied together with a combustion aid gas such as oxygen or air through the nozzle 123 of the burner 122 to generate a high temperature flame. On the side opposite to the nozzle 123 are provided a fuel supply portion 125 and an introductory portion 126 for the combustion aid gas. As illustrated in FIG. 6, the introductory portion 126 is communicated to the exhaust wind mill 107 of the cooler 104 through the conduit 108.

As illustrated in FIG. 7, the cyclone 124 has a cylindrical side wall 124a and a tapering bottom wall 124b, thus forming a tapered bottom. The bottom wall 124b is formed as a double wall in which water is circulated as indicated by arrows $W_1$ and $W_2$ in FIG. 7, so that the inside of the cyclone 124 can be cooled. On an upper part of the side wall 124a is provided a flame pipe 127 extending in a direction tangential thereto, as illustrated in FIG. 8. In one opening of the flame pipe 127 opposite to the cyclone 124 is arranged the nozzle 123 of the burner 122 so that it can generate a high temperature flame inside the flame pipe 127. Inside the flame pipe 127, a feed pipe 128 for feeding the powder of raw material is provided with its opening 128a being positioned slightly before the nozzle 123, i.e., slightly closer to the cyclone 124, so that powder of cement clinker or slag whose average particle diameter has been adjusted to a predetermined size can be supplied before the nozzle 124 of the burner, so that the powder can pass through the high temperature flame generated by the burner 122.

The cyclone 124 has a cover 129 which can close the upper opening of the cyclone. Near the center of the cover 129 is provided a communication pipe or vessel 130 which penetrates the cover 129 and opens inside the cyclone 124. The communication pipe 130 is to discharge exhaust gas from the burner 122 to outside the cyclone 124 and the other end thereof is communicated to an exhaust gas supply portion 109a or 109b which introduces the exhaust gas into the suspension preheater 102. The cyclone 124 has an outlet 131 at the bottom thereof for discharging the product, spheroidal particulate inorganic material.

With the apparatus 100 including the high temperature flame generator 121 and the cement kiln 101, the spheroidal particulate inorganic material, e.g., spheroidal cement or spheroidal slag, is produced as follows.

In the case of producing spheroidal cement, the powder of the raw material for producing cement is pulverized in the conventional manner and is supplied to the suspension preheater 102 to preheat therein the powder of the raw material, which is then supplied to the rotary kiln 103 where the preheated powder of the raw material is calcined in the rotary kiln 103 to obtain cement clinker. The cement clinker obtained is cooled in cold air in the cooler 104. The cooled cement clinker is pulverized again using a tube mill or the like and classified to obtain cement particles having an average particle size of about 60 $\mu$m or less. For the same reasons as described in the other embodiments described above, the average particle size of 60 $\mu$m or less is selected.

Then, a fuel is supplied to the burner 122 via the fuel supply portion 125, and on the other hand the exhaust gas (air) from the cooler 104 of the cement kiln 101 is supplied via the conduit 108 and the introductory portion 126 is supplied to the burner 122. The burner 122 is ignited to generate a high temperature flame.

Next, the cement particles whose particle size has been (adjusted to a predetermined value are stored in a storage tank (not shown), from which the cement clinker particles are supplied to the high temperature flame generator 121 through the feed pipe 128 so that they can be passed through the high temperature flame at a predetermined rate to convert them into a molten or semi-molten state.

The molten or semi-molten cement particles are entrained by the flame and jetted into the cyclone 124 where the cement clinker particles are cooled and spheroidized due to their surface tension. The cooled, spheroidal cement clinker particles thus prepared fall down in the cyclone 124 along its side wall 124a and the bottom wall 124b with turning. Upon contacting the double-layered, cooled bottom wall 124b, the cement clinker particles are cooled sufficiently to solidify and are discharged from the outlet 131.

On the other hand, the combustion exhaust gas resulting from the combustion of the fuel and the combustion aid gas (exhaust gas from the cooler 104) is introduced into the cyclone 124, in which the exhaust gas flows upward because its temperature is high and is naturally separated from the cement clinker particles due to the difference in specific gravity between the particles and the gas. The exhaust gas is then introduced into the communication pipe 130 and then to the exhaust gas supply portion 109a or 109b, and further supplied into the suspension preheater 102.

Suitable temperature of the high temperature flame generated by the burner 122 varies depending on the type of cement but is generally at least 1,300° C., preferably no lower than 1,500° C. If the temperature of the high temperature flame is below 1,300° C., the cement particles are not fully converted to a molten or semi-molten state, thus failing to spheroidize sufficiently. The retention time in the flame is preferably from about 0.01 to 0.02 second. When a fuel which contains a high ash content is used for the flame generation apparatus, it is necessary to adjust the amount of the raw materials for the production of cement so that the cement component be present in a predetermined amount. It is preferred that the gypsum powder have an average particle diameter of about 80 $\mu$m or less so as to match the average particle size of the cement clinker in order to increase the flowability and filling properties of the resulting spheroidal cement.

Spheroidal slag can be produced in substantially the same manner as the spheroidal cement using the above-described apparatus 100 illustrated in FIGS. 6 to 8 except for the thermal conditions and particle size of the slag particles. In this case, the cement clinker particles produced in the rotary kiln 103 are not introduced in the high temperature flame generator 103, but only the powder of raw material that has been adjusted to an average particle diameter of about 40 $\mu$m or less (e.g., a particle diameter range of from 15 to 55 $\mu$m) and stored temporarily in the storage tank (not shown), is supplied through a conduit (not shown) communicating the storage tank to the high temperature flame generator 121, and is introduced into the flame generator 121. The temperature of the flame is preferably at least 1,000° C. to 1,200° C. Other conditions are substantially the same as in the case of the spheroidal cement. After the spheroidal particles of slag are discharged from the outlet 131 of the cyclone 124, gypsum powder may be added, if desired. Alternatively, a mixture of the slag powder and gypsum powder may also be used as a raw material, both particles being adjusted to have a suitable particle size, respectively, in the same manner as described above with respect to the other embodiments. Of course, it is also possible to introduce both the slag particles and the cement clinker particles produced in the rotary kiln 103 simultaneously into the flame generator 121.

According to the present embodiment, because on one hand the hot exhaust gas from the cooler 104 is used as a combustion aid gas in the burner 122 and on the other hand the exhaust gas from the burner 122 is supplied to the exhaust supply portions 109a and 109b of the suspension preheater 102 to increase the thermal efficiency of the system, the apparatus 100 for the production of spheroidal particulate inorganic material, e.g., spheroidal cement and/or spheroidal slag (including spheroidal slag cement), can generate flame at a higher temperature due to an improvement of thermal efficiency by the use of the high temperature flame generator 121 and the cement kiln 101.

Figure 9:
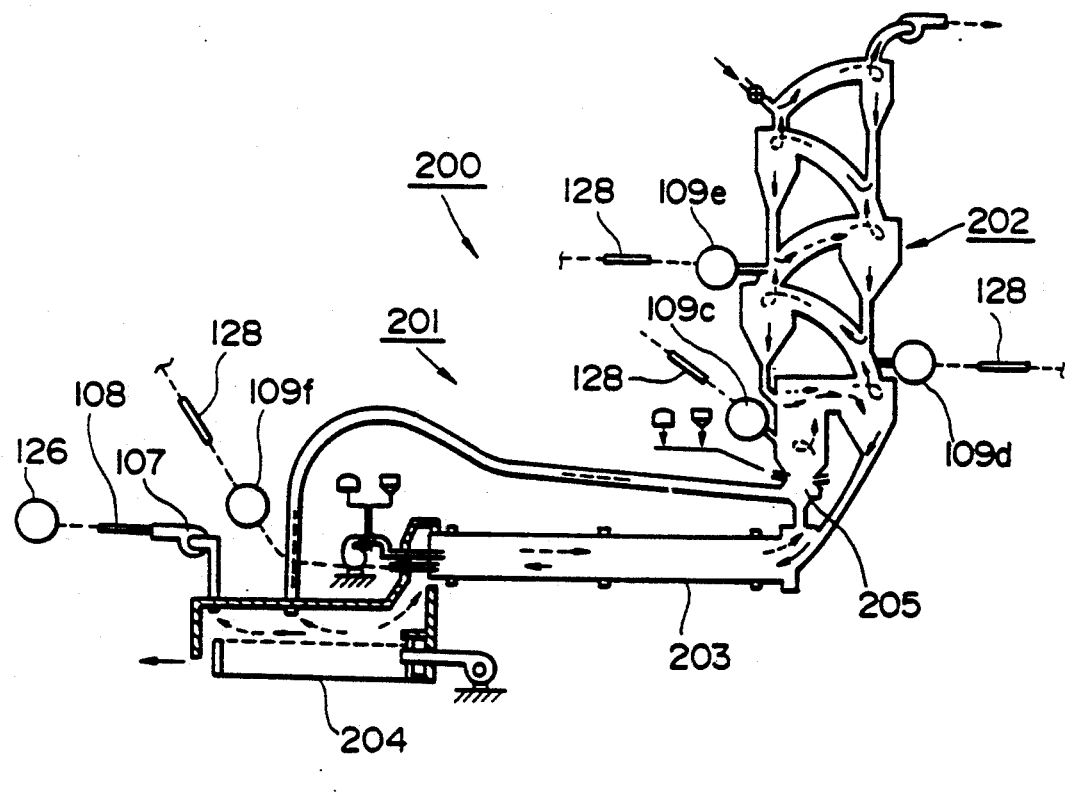
FIG. 9 is a schematic partial cross-section of the apparatus for producing a spheroidal particulate inorganic material according to yet another embodiment of the present invention.

FIG. 9 illustrates an apparatus for the production of spheroidal particulate inorganic material according to yet another embodiment of the present invention. In FIG. 9 reference numeral 200 denotes generally an apparatus for the production of spheroidal particulate inorganic material. The apparatus 200 includes a cement kiln 201 and a high temperature flame generator 121, which is the same as that illustrated in FIGS. 7 and 8. The cement kiln 201 is an NSP kiln which has a suspension preheater 202 for preheating powder of a raw material for producing spheroidal particulate inorganic material, typically spheroidal cement or spheroidal slag, a rotary kiln 203 installed downstream of the suspension preheater 202, and a cooler 204 disposed downstream of the rotary kiln 203. The suspension preheater 202 is provided with a calcination furnace 205. The powder of the raw material is preheated and calcinated in the preheater 102 and then supplied to the rotary kiln 203, where it is calcined and then sent to the cooler 204, in which it is cooled. The calcination furnace is provided with a feedback pipe 206 which is communicated to the cooler 204 on one end thereof and to the calcination furnace 205 on the other end and feeds the hot air from the cooler 204 back to the furnace 205. In this embodiment, a supply portion 109c is communicated to the calcination furnace 205 in the suspension preheater 202, and supply portions 109d and 109e are communicated to the suspension preheater 202. Further, a supply portion 109f is provided downstream of the rotary kiln 203. The communication pipe 130 of the cyclone 124 illustrated in FIG. 7 is communicated to one or more of the supply portions 109c, 109d, 109e and 109f. The construction and operation of the supply portions 109a through 109f are the same as those of the supply portions illustrated in FIG. 6. The construction and operation of the other elements such as the blow-in wind mill, the exhaust wind mill 107 and the conduit 108 in the cement kiln 201 are the same as the counterparts in the cement kiln 101 illustrated in FIG. 6. Cement and/or slag can be spheroidized efficiently using the above-described apparatus 200. The apparatus 200 exhibits an increased thermal efficiency.

In addition, in the apparatus 101 illustrated in FIG. 6 or the apparatus 201 illustrated in FIG. 9, it is possible to place the burner 122 in the outlet of the rotary kiln so that the high temperature flame generated thereby spheroidizes the cement clinker particles produced in the rotary kiln.

Furthermore, it is also possible to use the apparatus 1 illustrated in FIGS. 1 and 2 or the apparatus 51 illustrated in FIGS. 4 and 5 in combination with the apparatus 100 illustrated in FIG. 6 or the apparatus 200 illustrated in FIG. 8 in place of the high temperature flame generator 121 illustrated in FIG. 7 with modifications obvious to one skilled in the art.

EXAMPLE 1

Preparation of Spheroidal Cement

Cement clinker was prepared in a conventional manner. The cement clinker was calcined and melted (or semi-melted) in a high temperature flame at 1,500° C. followed by the addition of a gypsum powder thereto to obtain the spheroidal cement of the present invention.

Then, a mortar was prepared using the spheroidal cement thus obtained and adding thereto standard sand and water in proportions described below.

| Cement: | 520 g |
|---|---|
| Standard sand: | 1,040 g |
| Water: | 338 g (W/C = 65%) |

The mortar thus obtained was measured for its compression strength, bending strength and flow value according to JIS standard mortar, and the results obtained are shown in Table 1.

For comparison, a comparative mortar was prepared using a conventional non-spheroidal cement in the same proportions as above and the comparative mortar thus obtained was measured for its compression strength, bending strength and flow value in the same manner as above. The results obtained are also described in Table 1.

TABLE 1

Compression Strength, Bending Strength and Flow Value of Mortar

| Characteristics | | Mortar of Invention | Comparative Mortar |
|---|---|---|---|
| Compression Strength (kg/cm²) | Day 3 | 160 | 155 |
| | Day 7 | 275 | 255 |
| | Day 28 | 442 | 408 |
| Bending Strength (kg/cm²) | Day 3 | 52 | 40 |
| | Day 7 | 60 | 54 |
| | Day 28 | 74 | 71 |
| Flow Value (mm) | Day 3 | 280 | 235 |

The results shown in Table 1 above confirmed that the spheroidal cement of the present invention is superior in compression strength, bending strength and flow value to the conventional non-spheroidal cement when used in preparing mortar.

EXAMPLE 2

Preparation of Spheroidal Cement

A B-type high Portland furnace cement clinker was prepared in a conventional manner. The cement clinker was calcined and melted (or semi-melted) in a high temperature flame at 1,500° C. followed by the addition of a gypsum powder thereto to obtain the spheroidal cement of the present invention.

Then, mortar was prepared using the spheroidal cement thus obtained and adding thereto standard sand and water in proportions described below.

| Cement: | 520 g |
|---|---|
| Standard sand: | 1,040 g |

-continued

| Water: | 338 g (W/C = 65%) |
|---|---|

The mortar thus obtained was measured for its compression strength, bending strength and flow value according to JIS standard mortar, and the results obtained are shown in Table 2.

For comparison, a comparative mortar was prepared using a conventional non-spheroidal cement in the same proportions as above and the comparative mortar thus obtained was measured for its compression strength, bending strength and flow value in the same manner as above. The results obtained are also described in Table 2.

TABLE 2

Compression Strength, Bending Strength and Flow Value of Mortar

| Characteristics | | Mortar of Invention | Comparative Mortar |
|---|---|---|---|
| Compression Strength ($kg/cm^2$) | Day 3 | 146 | 127 |
| | Day 7 | 224 | 217 |
| | Day 28 | 442 | 416 |
| Bending Strength ($kg/cm^2$) | Day 3 | 35 | 32 |
| | Day 7 | 45 | 40 |
| | Day 28 | 74 | 70 |
| Flow Value (mm) | Day 3 | 278 | 248 |

The results shown in Table 2 above conformed that the spheroidal cement of the present invention is superior in compression strength, bending strength and flow value to the conventional non-spheroidal cement when used in preparing mortar.

EXAMPLE 3

Preparation of Spheroidal Cement

Cement clinker was prepared in a conventional manner and the cement clinker was pulverized. The particles were adjusted so as to have an average particle diameter of 2 μm. Separately, a binder solution was prepared by dispersing 1% by weight of an epoxy resin in methanol.

Next, the cement clinker whose average particle diameter was adjusted as described above was charged in a Henschel granulator and granulated while adding the binder solution portion-wise.

Observation of the cement clinker particles thus obtained under an electron microscope revealed that the respective particles had a substantially spheroidal shape and had an average particle diameter of 23 μm (cf. FIG. 1).

EXAMPLE 4

Preparation of Spheroidal Cement

Cement clinker was prepared in a conventional manner and the cement clinker was pulverized. The particles were adjusted so as to have an average particle diameter of 2 μm. Separately, a binder solution was prepared by dispersing 1% by weight of ethyl silicate in ethanol followed by a dehydration reaction.

Next, the cement clinker whose average particle diameter was adjusted as described above was dispersed in the binder solution in a weight proportion of 1:1 to obtain a slurry. The slurry was then dried using a spray drier to prepare particles.

Observation of the cement clinker thus obtained under an electron microscope revealed that the respective particles of thereof had a substantially spherical shape and had an average particle diameter of about 25 μm.

Then, mortar was prepared using the spheroidal cement clinker thus obtained and adding thereto standard sand and water in the proportions described below.

| Cement: | 520 g |
|---|---|
| Standard sand: | 1,040 g |
| Water: | 338 g (W/C = 65%) |

The mortar thus obtained was measured for its compression strength, bending strength and flow value according to JIS standard mortar, and the results obtained are shown in Table 3.

For comparison, a comparative mortar was prepared using a conventional non-spheroidal cement in the same proportions as above and the comparative mortar thus obtained was measured for its compression strength, bending strength and flow value in the same manner as above. The results obtained are also described in Table 3.

TABLE 3

Compression Strength, Bending Strength and Flow Value of Mortar

| Characteristics | | Mortar of Invention | Comparative Mortar |
|---|---|---|---|
| Compression Strength ($kg/cm^2$) | Day 3 | 158 | 155 |
| | Day 7 | 265 | 255 |
| | Day 28 | 421 | 408 |
| Bending Strength ($kg/cm^2$) | Day 3 | 45 | 40 |
| | Day 7 | 57 | 54 |
| | Day 28 | 73 | 71 |
| Flow Value (mm) | Day 3 | 285 | 235 |

The results shown in Table 3 above confirmed that the spheroidal cement of the present invention is superior in compression strength, bending strength and flow value to the conventional non-spheroidal cement when used in preparing mortar.

EXAMPLE 5

Preparation of Spheroidal Slag

Slag powder of an average particle diameter of 40 μm was prepared in a conventional manner. The slag powder was passed through a flame of 1,200° C. to perform spheroidizing treatment to obtain spheroidal slag. The angle of repose of the spheroidal slag was found to be 30°. For comparison, the angle of repose of a conventional slag (i.e., slag powder before spheroidizing treatment) was found to be 39°. The results confirmed that the spheroidizing treatment increased the flowability and filling properties of slag powder.

EXAMPLE 6

Preparation of Ground Improver Composition

The spheroidal slag obtained in Example 1 was added to a ground improver, TAFROCK (trade name for a product by Sumitomo Cement Co., Ltd.) in an amount of 10% by weight to prepare a ground improver composition of the present invention. For comparison, a comparative ground improver composition was prepared by adding 10% by weight of fly ash to the TAFROCK described above.

Both ground improver compositions as well as the original ground improver (TAFROCK) were measured for their slurry consistency (flowability) according to a P funnel method (JSCE-1986, Civil Engineering Association) under the conditions indicated below.
W/C ratio: 50%
Water-reducing agent: None
Slurry consistency obtained was expressed by the time of flow down of the ground improver composition.

| | |
|---|---|
| (1) Ground improver composition of invention: (+ spheroidal slag) | 11.8 seconds |
| (2) Comparative ground improver composition: (+ fly ash) | 12.3 seconds |
| (3) Original ground improver: | 14.5 seconds |

The results confirmed that the ground improver composition of the present invention is superior in flowability not only to the original ground improver but also to the comparative ground improver composition containing fly ash.

Mortars were prepared using the ground improver compositions described above under the following conditions.

| | |
|---|---|
| Standard sand: | 1,040 g |
| Water: | 338 g (W/C = 65%) |
| Ground improver: | 520 g |

The mortars thus obtained were measured for their compression strength and bending strength according to JIS standard mortar, and the results are shown in Tables 5 and 6 below.

TABLE 5
Compression Strength of Ground Improver Composition

| | | Compression Strength (kg/cm$^2$) | | |
|---|---|---|---|---|
| Run | Sample | Day 7 | Day 14 | Day 28 |
| 1 | Invention | 342 | 426 | 454 |
| 2 | Comparative | 324 | 391 | 401 |
| 3 | Original | 344 | 425 | 450 |

TABLE 6
Bending Strength of Ground Improver Composition

| | | Compression Strength (kg/cm$^2$) | | |
|---|---|---|---|---|
| Run | Sample | Day 7 | Day 14 | Day 28 |
| 1 | Invention | 59 | 89 | 108 |
| 2 | Comparative | 50 | 39 | 80 |
| 3 | Original | 62 | 84 | 87 |

The results shown in Tables 5 and 6 confirmed that the ground improver composition of the present invention was superior in compression strength and bending strength to the comparative ground improver composition and to the original ground improver.

EXAMPLE 7

Preparation of Spheroidal Cement

Cement clinker was prepared in a conventional manner. The cement clinker was calcined and melted (or semi-melted) in a high temperature flame followed by the addition of a gypsum powder thereto to obtain the spheroidal cement to be used in the present invention.

Then, mortar was prepared using the spheroidal cement thus obtained and adding thereto standard sand and water in proportions described below.

| | |
|---|---|
| Cement: | 520 g |
| Standard sand: | 1,040 g |
| Water: | 338 g (W/C = 65%) |

The mortar thus obtained was measured for its compression strength, bending strength and flow value according to JIS standard mortar, and the results obtained are shown in Table 7.

For comparison, a comparative mortar was prepared using a conventional non-spheroidal cement in the same proportions as above, and the comparative mortar thus obtained was measured for its compression strength, bending strength and flow value in the same manner as above. The results obtained are also described in Table 7.

TABLE 7
Compression Strength, Bending Strength and Flow Value of Mortar

| Characteristics | | Mortar of Invention | Comparative Mortar |
|---|---|---|---|
| Compression Strength (kg/cm$^2$) | Day 3 | 160 | 155 |
| | Day 7 | 275 | 255 |
| | Day 28 | 442 | 408 |
| Bending Strength (kg/cm$^2$) | Day 3 | 52 | 40 |
| | Day 7 | 60 | 54 |
| | Day 28 | 74 | 71 |
| Flow Value (mm) | Day 3 | 280 | 235 |

The results shown in Table 7 above confirmed that the spheroidal cement of the present invention is suspension in compression strength, bending strength and flow value to the conventional non-spheroidal cement when used in preparing mortar.

EXAMPLE 8

Preparation of Ground Improver Composition

The spheroidal cement obtained in Example 7 was added to a ground improver, TAFROCK (trade name for a product by Sumitomo Cement Co., Ltd.) in an amount of 10% by weight to prepare a ground improver composition of the present invention. For comparison, a comparative ground improver composition was prepared by adding 10% by weight of fly ash to TAFROCK described above.

Both ground improver compositions as well as the original ground improver (TAFROCK) were measured for their slurry consistency (flowability) according to a P funnel method (JSCE-1986, Civil Engineering Association) under the conditions indicated below.
W/C ratio: 50%
Water-reducing agent: None
Slurry consistency obtained was expressed by the time of flow down of the ground improver composition.

| | |
|---|---|
| (1) Ground improver composition of invention: (+) spheroidal slag) | 12.5 seconds |
| (2) Comparative ground improver composition: (+ fly ash) | 12.3 seconds |
| (3) Original ground improver: | 14.5 seconds |

The above results confirmed that the ground improver composition of the present invention has flowability superior to the original ground improver and substantially equal to the comparative ground improver composition containing fly ash.

Mortars were prepared using the ground improver compositions described above under the following conditions.

| | |
|---|---|
| Standard sand: | 1,040 g |
| Water: | 338 g (W/C = 65%) |
| Ground improver: | 520 g |

The mortars thus obtained were measured for their compression strength and bending strength according to JIS standard mortar, and the results are shown in Tables 8 and 9 below.

TABLE 8

Compression Strength of Ground Improver Composition

| | | Compression Strength (kg/cm$^2$) | | |
|---|---|---|---|---|
| Run | Sample | Day 7 | Day 14 | Day 28 |
| 1 | Invention | 345 | 430 | 460 |
| 2 | Comparative | 324 | 391 | 401 |
| 3 | Original | 344 | 425 | 450 |

TABLE 9

Bending Strength of Ground Improver Composition

| | | Compression Strength (kg/cm$^2$) | | |
|---|---|---|---|---|
| Run | Sample | Day 7 | Day 14 | Day 28 |
| 1 | Invention | 65 | 90 | 110 |
| 2 | Comparative | 50 | 39 | 80 |
| 3 | Original | 62 | 84 | 87 |

The results shown in Tables 8 and 9 confirmed that the ground improver composition of the present invention was superior in compression strength and bending strength to the comparative ground improver composition and to the original ground improver.

EXAMPLE 10

Preparation of Spheroidal Slag

Slag powder of an average particle diameter of 40 μm was prepared in a conventional manner. The slag powder was passed through a flame of 1,200° C. to perform a spheroidizing treatment to obtain spheroidal slag.

The angle of repose of the spheroidal slag was found to be 30°. For comparison, the angle of repose of a conventional slag (i.e., slag powder before spheroidizing treatment) was found to be 39°. The results confirmed that the spheroidizing treatment increased the flowability and filling properties of slag powder.

EXAMPLE 11

Preparation of Ground Improver Composition

A B type Portland blast furnace cement was prepared using the spheroidal slag obtained in Example 10. The cement obtained was tested according to JIS standard mortar. The mortar used was prepared by adding standard sand and water in the proportions described below.

| | |
|---|---|
| Cement: | 520 g |
| Standard sand: | 1,040 g |
| Water: | 338 g (W/C = 65%) |

The mortar thus obtained was measured for its compression strength and bending strength according to JIS standard mortar, and the results are shown in Tables 10 and 11 below.

For comparison, a B-type Portland blast furnace cement was prepared using a conventional slag without the spheroidizing treatment, and a comparative mortar was prepared using the conventional non-spheroidal cement together with standard sand and water in the same proportions as above; the comparative mortar thus obtained was measured for its compression strength, bending strength and flow value in the same manner as above. The results obtained are also described in Table 10 below.

TABLE 10

Compression Strength, Bending Strength and Flow Value of Mortar

| Characteristics | | Mortar of Invention | Comparative Mortar |
|---|---|---|---|
| Compression Strength (kg/cm$^2$) | Day 3 | 130 | 127 |
| | Day 7 | 220 | 217 |
| | Day 28 | 428 | 416 |
| Bending Strength (kg/cm$^2$) | Day 3 | 33 | 32 |
| | Day 7 | 41 | 40 |
| | Day 28 | 72 | 70 |
| Flow Value (mm) | Day 3 | 260 | 248 |

The results shown in Table 10 confirmed that the ground improver composition of the present invention was superior in compression strength and bending strength to the comparative ground improver composition and to the original ground improver.

EXAMPLE 12 Preparation of Quick-Hardening Cement

As a quick-hardening component, a clinker of a quick-hardening cement (Jet Cement, a trade name for a product of Sumitomo Cement Co., Ltd.) was pulverized to have an average particle diameter of 60 μm. The particles thus prepared were passed through a flame at a temperature of from 1,000° to 1,200° C. to calcine and melt (or semi-melt) them, and cooled to form spheroidal particles. Then powder of anhydrous gypsum was added to the spheroidal particles to obtain a spheroidal jet cement.

Next, the spheroidal jet cement was mixed with ordinary Portland cement in the various proportions shown in Table 9-1, and then mortars were prepared using the mixture in weight proportions such that standard sand/cement is 2/1 and the ratio of water to cement (W/C ratio) is 50% by weight. The mortars were tested for their flowability, bending strength and compression strength.

For comparative runs, jet cement subjected to no spheroidal treatment was mixed with ordinary Portland cement in the same proportions as above and mortars were prepared in the same manner as above. The non-spheroidal mortars were tested for their flowability, bending strength and compression strength.

The results are shown in Table 12 below.

TABLE 12

| Sample No. | Composition | Proportion |
|---|---|---|
| 1 | Ordinary Portland Cement | 100% |
| 2 | Ordinary Portland Cement | 80% |
| | Ordinary Jet Cement | 20% |
| 3 | Ordinary Portland Cement | 80% |
| | Spheroidal Jet Cement | 20% |
| 4 | Ordinary Portland Cement | 60% |
| | Ordinary Jet Cement | 40% |
| 5 | Ordinary Portland Cement | 60% |
| | Spheroidal Jet Cement | 40% |
| 6 | Ordinary Portland Cement | 40% |

TABLE 12-continued

| Sample No. | Composition | Proportion |
|---|---|---|
| 7 | Ordinary Jet Cement | 60% |
|  | Ordinary Portland Cement | 40% |
| 8 | Spheroidal Jet Cement | 60% |
|  | Ordinary Portland Cement | 20% |
|  | Spheroidal Jet Cement | 80% |

TABLE 13

| Run | Composition W/C = 50 | | Flow Value | Bending Strength | | | Compression Strength | | |
|---|---|---|---|---|---|---|---|---|---|
| | | | | Day 3 | Day 7 | Day 28 | Day 3 | Day 7 | Day 28 |
| 1 | OPC | 100% | 181 | 49.0 | 60.4 | 73.4 | 266 | 368 | 489 |
| 2 | OPC | 20% | 180 | 18.6 | 62.4 | 69.3 | 46 | 328 | 468 |
| 3 | SJC | 20% | 187 | 57.0 | 72.6 | 81.0 | 338 | 447 | 581 |
| 4 | OJC | 40% | 180 | 24.0 | 50.4 | 81.5 | 82 | 266 | 471 |
| 5 | SJC | 40% | 190 | 41.8 | 70.8 | 79.8 | 259 | 464 | 579 |
| 6 | OJC | 60% | 145 | 28.8 | 38.8 | 84.8 | 163 | 298 | 490 |
| 7 | SJC | 60% | 198 | 74.1 | 90.4 | 86.0 | 416 | 533 | 582 |
| 8 | SJC | 80% | 172 | 78.3 | 99.5 | 101 | 431 | 580 | 612 |

Notes
W/C: Water/cement ratio
OPC: Ordinary Portland cement
OJC: Ordinary jet cement
SJC: Spheroidal jet cement The results shown in Table 13 confirmed that the addition of spheroidal jet cement to ordinary Portland cement improved the flow value, bending strength and compression strength of the cement composition, and that hardening time could be adjusted by varying the mixing ratio of the spheroidal jet cement to ordinary Portland cement.

The invention has been described in detail with respect to embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An apparatus for producing a spheroidal particulate construction material comprising particles of a construction material selected from the group consisting of cement, slug and gypsum; the apparatus comprising a suspension preheater for preheating raw powder of said construction material, a rotary kiln for calcining the preheated powder of said construction material connected to said suspension preheater, a cooler for cooling the calcined construction material connected to said rotary kiln, a burner which is connected to said cooler and having a nozzle which generates a high temperature flame through which the powder of said construction material is passed so that it is melted or semi-melted, an introductory portion in communication with the cooler and the burner for introducing a first exhaust gas discharged from said cooler into said burner, and a feed pipe for feeding high temperature fine powder of said construction material preheated by said suspension preheater into the high temperature flame of said burner, wherein said apparatus further comprises a cyclone having a cylindrical side wall, a cooling means for cooling the construction material in the cyclone, and a flame pipe provided on said side wall, said nozzle of the burner connected to said cooler and said feed pipe for feeding the preheated high temperature fine powder of said construction material to the flame of said burner being arranged inside said flame pipe, in close vicinity to each other, the opening end portion of said feed pipe being directed toward the flame of said burner, wherein said cyclone has a structure so that the particles of the construction material are passed through the high temperature flame to convert them into a melted or semi-melted state and are jetted into the cyclone, thereby the melted or semi-melted particles are cooled and spheroidized.

2. An apparatus as claimed in claim 1, wherein said cyclone further comprises an upper opening having a cover, a tapering bottom wall, said bottom wall having said cooling means, and wherein the flame pipe is provided on said cylindrical side wall on its upper part and extends in a direction tangential to said cylindrical side wall.

3. An apparatus as claimed in claim 2, wherein said feed pipe is in a substantially parallel arrangement with said burner connected to said cooler, the opening end of said feed pipe being inserted into the flame pipe slightly inward in comparison with said burner connected to said cooler and being bent toward the direction of the flame from the burner.

4. An apparatus as claimed in claim 2, wherein said cooling means of the bottom wall comprises a double wall through which water is circulated.

5. An apparatus as claimed in claim 2, wherein a communication pipe for discharging a second exhaust gas from said burner connected to said cooler to outside the cyclone is provided on said cover of the cyclone, the other end of the communication pipe being communicated to said suspension preheater to introduce the second exhaust gas into the suspension preheater.

6. An apparatus for producing a spheroidal particulate construction material comprising particles of a construction material selected from the group consisting of cement, slug and gypsum; the apparatus comprising a suspension preheater for preheating raw powder of said construction material, a rotary kiln for calcining the powder from said suspension preheater, a cooler for cooling the calcined construction material connected to said rotary kiln, said suspension preheater having a calcination furnace for calcining the preheated powder of said construction material at a lower portion thereof, said calcination furnace communicated to the cooler through a feedpack pipe which feeds the hot air from the cooler back to said calcination furnace, a burner which is connected to said cooler and having a nozzle which generates a high temperature flame through which the powder of said construction material is passed so that it is melted or semi-melted, an introductory portion for introducing a first exhaust gas discharged from said cooler into said burner, which is communicated to both said cooler and to said burner, and a feed pipe for feeding high temperature fine powder of said construction material preheated by said suspension preheater into the high temperature flame of said burner, wherein said apparatus further comprises a cyclone having a cylindrical side wall, a cooling means for cooling the construction material in the cyclone, and a flame pipe provided on said side wall, said nozzle of the burner connected to said cooler and said feed pipe for feeding the preheated high temperature fine powder of said construction material to the flame of said burner being arranged inside said flame pipe, in close vicinity to each other, the opening end portion of said feed pipe being directed toward the flame of said burner, wherein said cyclone has a structure so that the particles of the construction material are passed through the high temperature flame to convert them into a melted or semi-melted state and are jetted into the cyclone, thereby the melted or semi-melted particles are cooled and spheroidized.

7. An apparatus as claimed in claim 6, wherein said cyclone further comprises an upper opening having a cover, a tapering bottom wall, said bottom wall having said cooling means, and wherein the flame pipe is provided on said side wall on its upper part and extends in a direction tangential to said cylindrical side wall.

8. An apparatus as claimed in claim 7, wherein said feed pipe is arranged substantially in parallel with said burner connected to said cooler, the opening end of said feed pipe being inserted into the flame pipe slightly inward in comparison with said burner connected to said cooler and being bent toward the direction of the flame from the burner.

9. An apparatus as claimed in claim 7, wherein said cooling means of the bottom wall comprises a double wall through which water is circulated.

10. An apparatus as claimed in claim 7, wherein a communication pipe for discharging a second exhaust gas from said burner connected to said cooler to outside the cyclone is provided on said cover of the cyclone, the other end of the communication pipe being communicated to said suspension preheater to introduce the second exhaust gas into the suspension preheater.

* * * * *